US 6,545,687 B2

(12) United States Patent
Scott et al.

(10) Patent No.: US 6,545,687 B2
(45) Date of Patent: Apr. 8, 2003

(54) THUMBNAIL MANIPULATION USING FAST AND ASPECT RATIO ZOOMING, COMPRESSING AND SCALING

(75) Inventors: Paul Q. Scott, Pymble (AU); Jeremy D. M. Thorp, Chatswood (AU); Timothy M. Long, Lindfield (AU); Nicolas L. Coleman, Globe (AU); Richard M. Antill, Chatswood (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/002,883

(22) Filed: Jan. 5, 1998

(65) Prior Publication Data
US 2002/0000998 A1 Jan. 3, 2002

(30) Foreign Application Priority Data

Jan. 9, 1997 (AU) ............................. PO4536
Oct. 3, 1997 (AU) ............................. PO9629
Nov. 14, 1997 (AU) ............................. PP0408

(51) Int. Cl.[7] ............................. G06T 15/00
(52) U.S. Cl. ............................. 345/629
(58) Field of Search ............... 345/433, 439, 345/438, 629, 643, 645, 634, 637, 638

(56) References Cited

U.S. PATENT DOCUMENTS

| 4,197,590 A | 4/1980 | Sukonick et al. ............ 364/900 |
| 5,048,111 A | 9/1991 | Jones et al. ............... 382/56 |
| 5,107,334 A | 4/1992 | Matsumoto ................ 358/180 |
| 5,140,677 A | 8/1992 | Fleming et al. ............. 395/159 |
| 5,263,136 A | 11/1993 | DeAguiar et al. ........... 295/164 |
| 5,363,504 A | 11/1994 | Hasuo ..................... 395/600 |
| 5,384,904 A | 1/1995 | Sprague et al. ............ 395/139 |
| 5,414,811 A | 5/1995 | Parulski et al. ............ 295/162 |
| 5,544,302 A | 8/1996 | Nguyen ................... 395/161 |
| 5,949,424 A | * 9/1999 | Cabral et al. .............. 345/426 |

FOREIGN PATENT DOCUMENTS

| AU | 640281 | 5/1992 |
| AU | 639635 | 9/1992 |
| AU | 683254 | 11/1994 |
| EP | 0 717 346 | 6/1996 |
| EP | 0 855 838 | 7/1998 |
| WO | WO 96/29818 | 9/1996 |

OTHER PUBLICATIONS

D. Florêncio, et al., "A Non–Expansive Pyramidal Morphological Image Coder", Proceedings of International Conference on Image Processing, IEEE Comp. Soc. Press, pp. 331–335 (1994).

(List continued on next page.)

Primary Examiner—Phu K. Nguyen
(74) Attorney, Agent, or Firm—Fitzpatrick, Cella, Harper & Scinto

(57) ABSTRACT

A method and apparatus manipulates thumbnail images as used in image-based browsing file management systems. Zooming in and out of thumbnail images can be performed without a continued need to decompress a true image thus providing for faster operation. Pixel interpolation and/or replication are used to generate intermediate images that are displayed to deliver to the user a perception of a transitory zoom yet are of sufficient detail to maintain user orientation. Aspect ratio zooming of thumbnail containment areas is also disclosed which facilitates ease of browsing. The compression of thumbnail type images using a discrete wavelet transform facilitates the fast zoom of thumbnails and their associated containment areas.

96 Claims, 27 Drawing Sheets

OTHER PUBLICATIONS

S. Panchanathan, et al., "Image Scalability Using Wavelet Vector Quantization", Journal of Electronic Imaging, vol. 5, No. 2, pp. 167–174 (Apr. 1996).

A. Netravali, et al., "A Picture Browsing System", IEEE Transactions on Communication, vol. Com.–29, No. 12, pp. 1968–1976 (Dec. 1981).

R. Spence, et al., "Data Base Navigation: An Office Environment for the Professional", Behavior and Information Technology, vol. 1, No. 1, pp. 43–54 (1982).

L. Standing, "Learning 10,000 Pictures", Quarterly Journal of Experimental Psychology, vol. 25, pp. 207–222 (1973).

Harvey A. Cohen, "Proposal for JPEG: Thumbnail–based image access/retrieval", Jul. 10, 1996, pp. 676–682, SPIE vol. 2952.

* cited by examiner

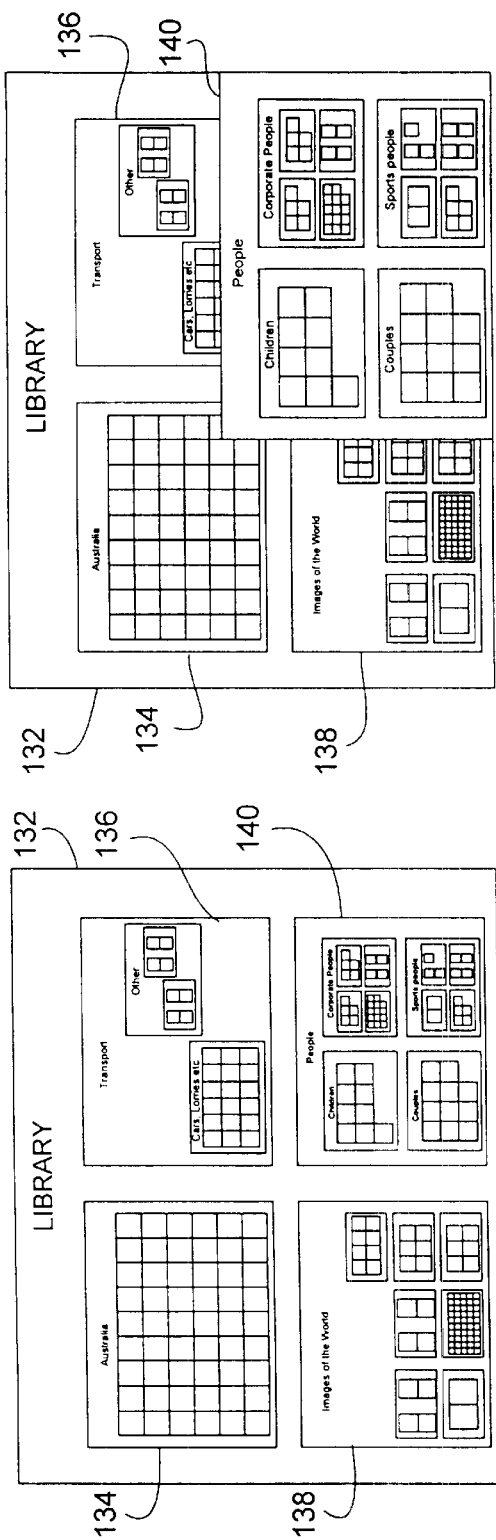
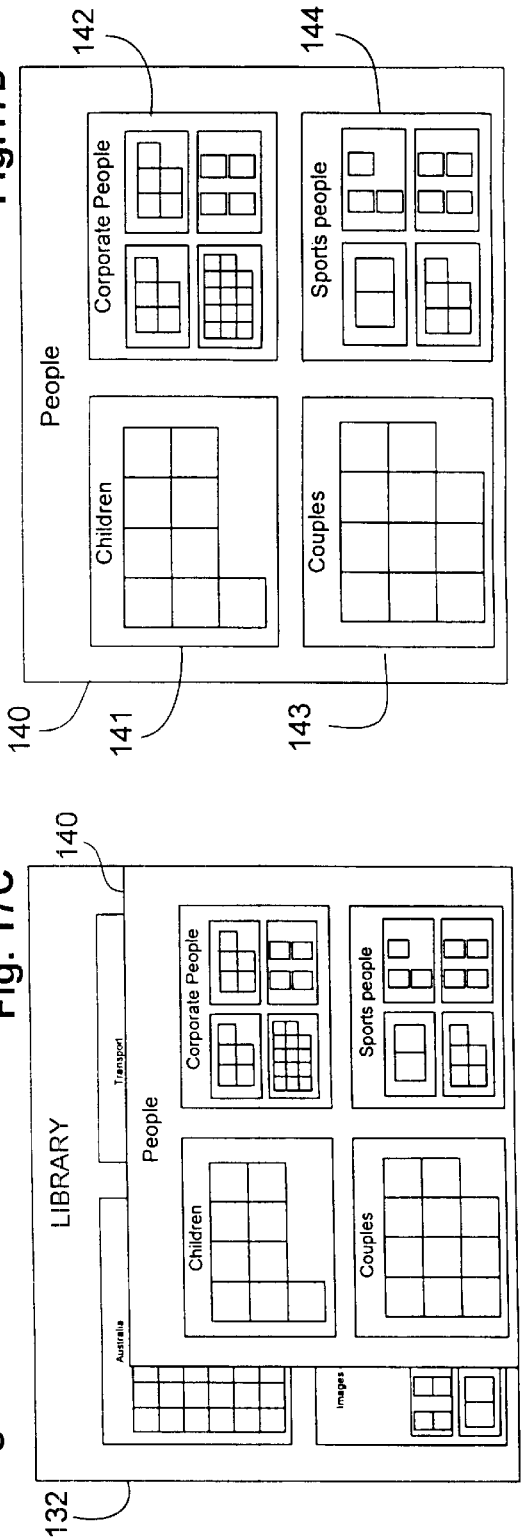
Fig. 17A
Fig. 17B
Fig. 17C
Fig. 17D

THUMBNAIL MANIPULATION USING FAST AND ASPECT RATIO ZOOMING, COMPRESSING AND SCALING

FIELD OF THE INVENTION

The present invention relates to the display of images on a display device and, in particular, to a fast process for zooming-in and out of images, to the layout and associated zooming of image thumbnails for image browsing, and to the encoding and scaling of image thumbnails for fast display of multiple images at varying resolutions in applications such as image browsing.

BACKGROUND

As the price of digital cameras continues to fall, and as personal computers become increasingly more powerful, the number of digital images managed by home and small business computer users is set to increase dramatically in the very near future. Despite this, the need for software image browsers to move beyond the limitations of the current design conventions to support effective browsing of many thousands of images has received relatively little attention. Further, despite the large number of digital images commonly encountered by users, fixed size image thumbnails or image icons continue to be used as the basis for designing conventional image browsing applications.

Existing image browsers are based on the concept of displaying fixed size image thumbnails to users. Image thumbnails are small copies of actual image files that the thumbnails represent. Typically, thumbnails are displayed at between 80×80 pixels and 120×120 pixels. This allows visual display screens to display between 9 and 25 thumbnails at any one time depending on the screen and thumbnail resolutions, and the interface design. Consequently, when browsing large numbers of image thumbnails, users are unable to see more than a small proportion of the images of interest and are typically forced to scroll through vast arrays of thumbnails. This results in significant browsing and orientation problems.

The fixed resolution at which designers of existing image browsers choose to display thumbnails represents a trade off between the two primary uses of thumbnails in image browsers, those being browsing image content and assessing image content. Browsing image content is defined here as briefly scanning or glancing at image thumbnails to gain an overview of the images available. Browsing content is limited by the number of thumbnails that can be displayed at once. Assessing image content is a closer examination of image thumbnails and the assessment of detail, and is limited by the resolution of thumbnails that can be displayed.

Conventional approaches to the use of thumbnails have a number of disadvantages including the display of only a portion of fixed size thumbnails in a display area not large enough to display all the thumbnails and the use of scroll bars. Both of these contribute to user disorientation, general difficulty of navigating an image space, and an inconsistent spatial representation of the image space, amongst other things.

Besides the disadvantages of only displaying only a portion of fixed size thumbnails, using scroll bars making navigation of an image space difficult, and providing an inconsistent spatial representation of the image space, such fixed size thumbnails themselves can use large amounts of memory or alternatively take relatively long period to decompress from compressed image storage. For example, a conventional method of thumbnail zooming-involves performing progressive decompressions of the thumbnail image until the desired image is obtained. This provides for a representative depiction of the zoom as seen by the user but involves performing a number of complex decompressions in succession. This has been found to consume valuable processor and operator time which is undesirable.

Thus, a need clearly exists for a method of providing thumbnails that are not fixed in size, have reduced memory requirements, are capable of rapid scaling, and provide for improved browsing applications.

SUMMARY OF THE INVENTION

It is an object of the present invention to substantially overcome, or at least ameliorate, one or more problems associated with prior arrangements.

In accordance with a first aspect of the present invention there is provided a method of zooming an image on a display device, said method comprising the steps of:

displaying a first representation of said image at a first predetermined size, said first representation having a first predetermined resolution;

stretching or shrinking the first representation to provide one or more modified representations;

successively displaying said one or more modified representations; and thereafter displaying a further representation of said image at a second predetermined size, said further representation having a further predetermined resolution;

wherein said further predetermined size and resolution are different to said first predetermined size and resolution.

Preferably, the one or more other predetermined sizes are intermediate a first and second predetermined size. In the event where the first image is being stretched, the second image is preferably a greater resolution version of the first image and where the first image is being shrunk the second image is preferably a lower resolution version of the first image. Typically, the first and second image are stored in a memory storage device (eg.: CD-ROM hard drive, floppy drive, RAM, ROM card) in a compressed representation, and preferably are a first and second resolution of the same image respectively.

In accordance with a second aspect of the invention, there is provided a method of zooming thumbnails of digital images for use in image browsing, the method comprising the steps of:

laying out the thumbnails in at least one containment area having the same aspect ratio as an available display area of a display device; and scaling the thumbnails contained in the at least one containment area to fit within the available area of the containment area.

Preferably, the method further comprises the step of increasing the scale of the thumbnails if increased detail of the thumbnails is required for assessment. More preferably, the thumbnails are scaled to be as large as possible and fit within the available display area.

The method may further comprise the step of organising the thumbnails into two or more groups in respective containment areas, and the groups may have a hierarchical structure. Still further, one or more groups laid out in respective containment areas may comprise two or more (sub)groups of thumbnails laid out in respective (sub)

containment areas, each (sub)containment area having the same aspect ratio as the parent containment area and the displayable area.

In accordance with a third aspect of the invention, there is provided an apparatus for zooming digital images for use in image browsing, said thumbnails being displayable on a display module, the apparatus comprising:

a device for laying out the thumbnails in at least one containment area having the same aspect ratio as an available display area of a display module; and a device for scaling the thumbnails contained in the at least one containment area to fit within the available area of the containment area.

Preferably, the apparatus comprises a computer and a computer readable medium having recorded thereon a computer program for zooming the digital images, the computer program carrying out the method described above, wherein the computer program can be loaded into and run by the computer to implement the apparatus.

In accordance with a fourth aspect of the invention, there is provided a computer program product having a computer readable medium having a computer program recorded thereon for zooming digital images for use in image browsing, the digital images each having a corresponding thumbnail, the computer program product comprising:

a module for laying out the thumbnails in at least one containment area having the same aspect ratio as an available display area of a display module; and a module for scaling the thumbnails contained in the at least one containment area to fit within the available area of the containment area.

In accordance with a fifth aspect of the invention, there is provided a method of scaling thumbnails representing digital images, the method comprising the step of encoding a digital image using a hierarchical representation to provide a thumbnail. Further, the method includes the step of decoding the hierarchical representation of the digital image at a predetermined one of a plurality of scales to provide the thumbnail having a desired size. The scale of the decoded hierarchical representation may be equal to or greater than the desired size of the thumbnail.

Still further, the method may include the step of downsampling the decoded hierarchical representation to provide the desired size thumbnail if the scale of the decoded hierarchical representation is greater than the desired size of the thumbnail. Alternatively, it may include the step of upsampling the decoded hierarchical representation to provide the desired-size thumbnail if the scale of the decoded hierarchical representation is less than the desired size of the thumbnail. The method may also include the step of decoding the hierarchical representation of the digital image at two different adjacent scales of a plurality of scales to provide the thumbnail having a desired size. The two decoded hierarchical representations having different adjacent scales can be interpolated to provide the desired-size thumbnail if the scale of one of the two decoded hierarchical representations is greater than the desired thumbnail size and the other of the two decoded hierarchical representations is less than the desired thumbnail size. The method may further comprise the step of displaying the thumbnail.

Preferably, the encoding step includes the step of applying a hierarchical discrete wavelet transform to the image. Advantageously the encoding comprises SWEET encoding. Compressed thumbnails and decompressed versions of thumbnails at particular sizes may be cached. Optionally, intermediate scales of decompressed thumbnails may also be cached.

In accordance with a sixth aspect of the invention, there is provided an apparatus for scaling thumbnails representing digital images, the apparatus comprising:

means for storing a thumbnail, the thumbnail comprising a hierarchically encoded representation of a digital image; and means for decoding the hierarchical representation of the digital image at at least a predetermined one of a plurality of scales to provide the thumbnail having a desired size.

In accordance with a seventh aspect of the invention, there is provided a computer program product comprising a computer readable medium having a computer program recorded thereon for scaling thumbnails representing digital images, the computer program product comprising:

means for storing a thumbnail, the thumbnail comprising a hierarchically encoded representation of a digital image; and means for decoding the hierarchical representation of the digital image at at least a predetermined one of a plurality of scales to provide the thumbnail having a desired size.

Many other aspects of the invention and present disclosure will become apparent on review and understanding the following descriptions and claims.

BRIEF DESCRIPTION OF THE DRAWINGS

A number of embodiments of the present invention will now be described with reference to the accompanying drawings in which:

FIGS. 17A–17D illustrate the fast zoom process of FIGS. 4 to 7 as applied to the containment areas of FIGS. 14 and 15;

DETAILED DESCRIPTION

Figure 1:
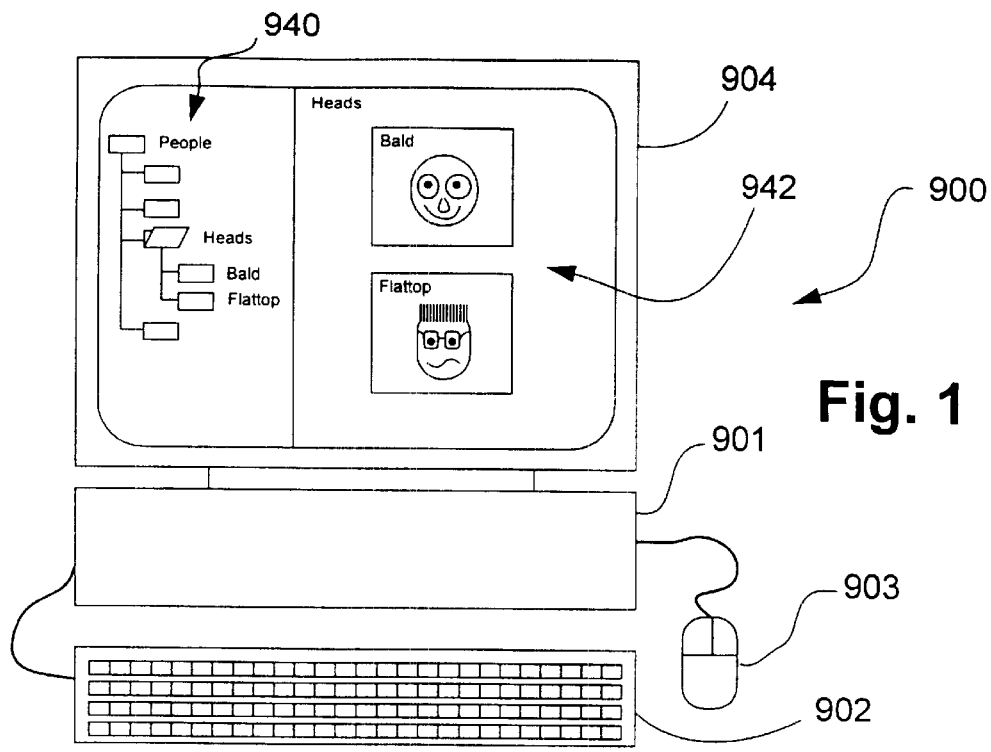
FIG. 1 shows an example configuration of a personal computer system of an embodiment.
Figure 2:
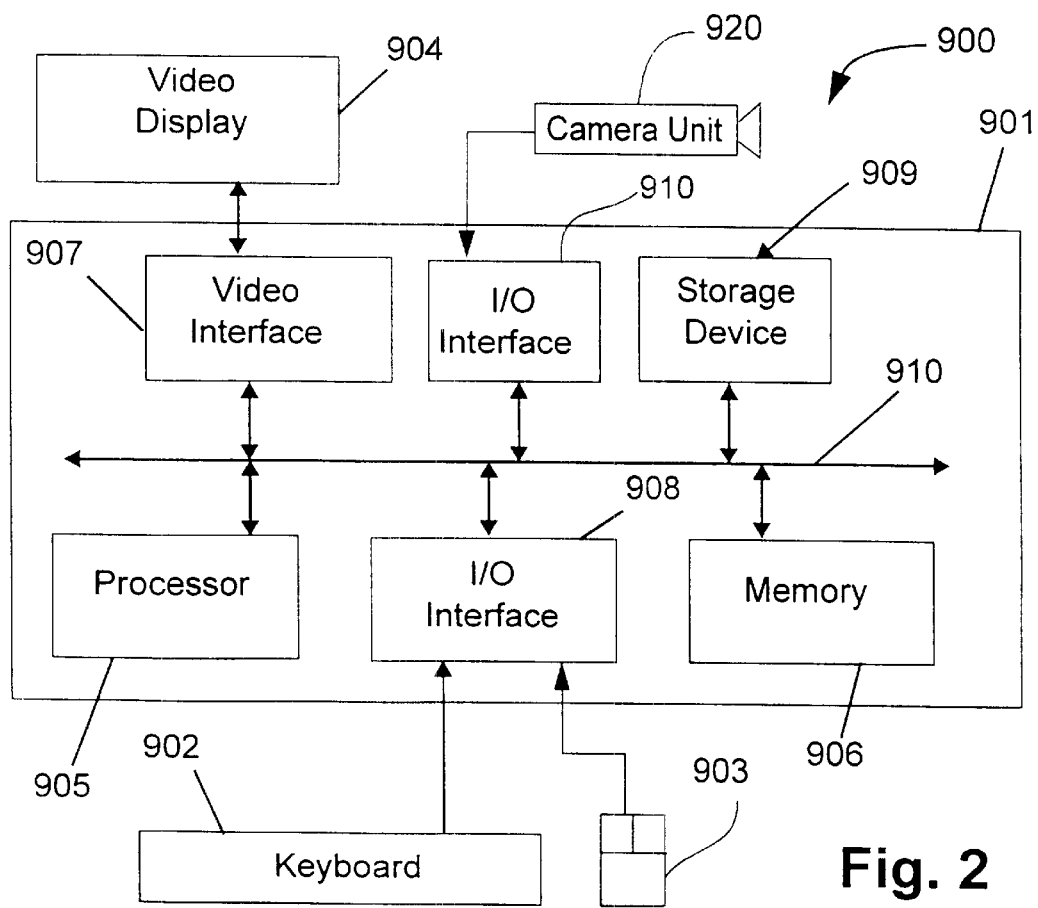
FIG. 2 is a schematic block diagram of the system of FIG. 1.

FIGS. 1 and 2 illustrate a representative embodiment of such a personal computer system 900 for implementing the processes to be described. The computer system 900 includes a computer 901, and a video display monitor 904. It may also include one or more input devices 902,903. User inputs to operate the computer 901 are provided by the input devices. For example, a user can provide input to the computer 901 via a keyboard 902 and/or a pointing device such as the mouse 903. The computer system 900 may be connected to one or more other computers using a communication channel such as a modem communications path, a computer network, or the Internet, for example. Further, any of several types of output devices including plotters, printers, laser printers, and other reproduction devices may be connected to the computer module 901.

Figure 9:
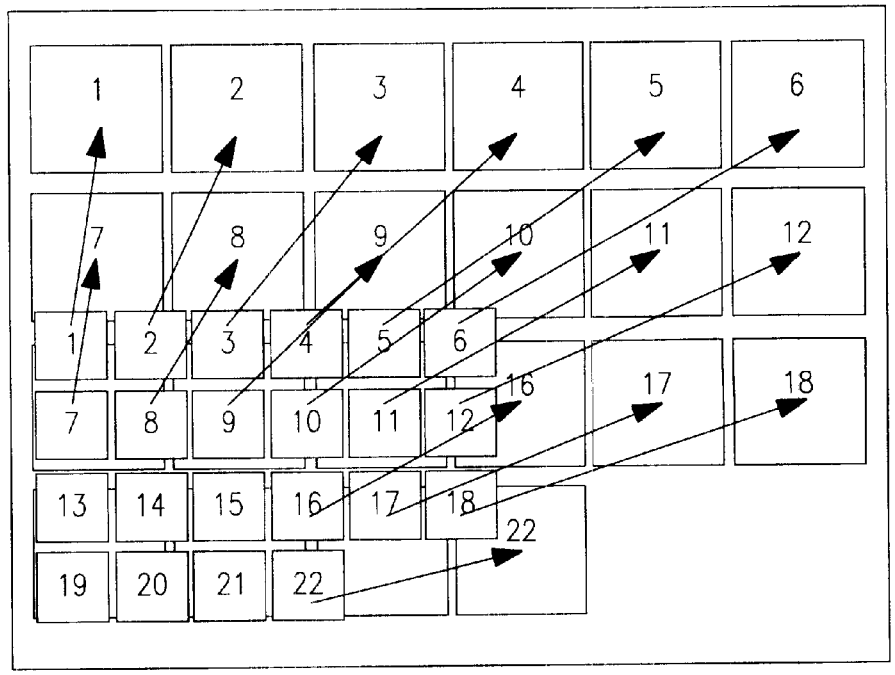
FIG. 9 is a schematic illustration of the scaling of a group of thumbnails of FIG. 8 in accordance with the aspect ratio zooming process according to an embodiment.

The computer module 901 has one or more central processing units (CPU or processor) 905, memory 906 including random access memory (RAM), static RAM or cache, and read-only memory (ROM), a video interface/adaptor 907, an input/output (I/O) interface 910, and storage device(s) generally depicted by block 909 in FIG. 9. A video interface/adaptor 907 connects to the video display monitor 904 provides video signals from the computer module 901 for display on the video display monitor 904. Optionally, an image or video capture device 920 (eg., a digital camera) can be connected to the computer 901 via the interface 910 as a source of digital images or video sequences that can be represented by thumbnails in accordance with the described embodiment.

The storage device(s) 909 may comprise a floppy disc, a hard, disc drive, a magneto-optical disc drive, magnetic tape, CD-ROM and/or any other of a number of non-volatile storage devices. The components 905 to 910 shown in FIG. 9 are coupled to each other via a bus 911. The bus 911 in turn can comprise data, address, and control buses. The overall structure and individual components of the computer system 900 is essentially conventional and would be well known to persons skilled in the art. Thus, the system 900 is simply provided for illustrative purposes and other configurations can be employed without departing from the scope and spirit of the invention. The computer system may be implemented using an IBM personal computer (PC) or compatible, one of the Macintosh (TM) family of PCs, Sun Sparcstation (TM), or the like. The foregoing are merely exemplary of the types of computers with which the embodiments of the invention may be practiced.

Figure 3:
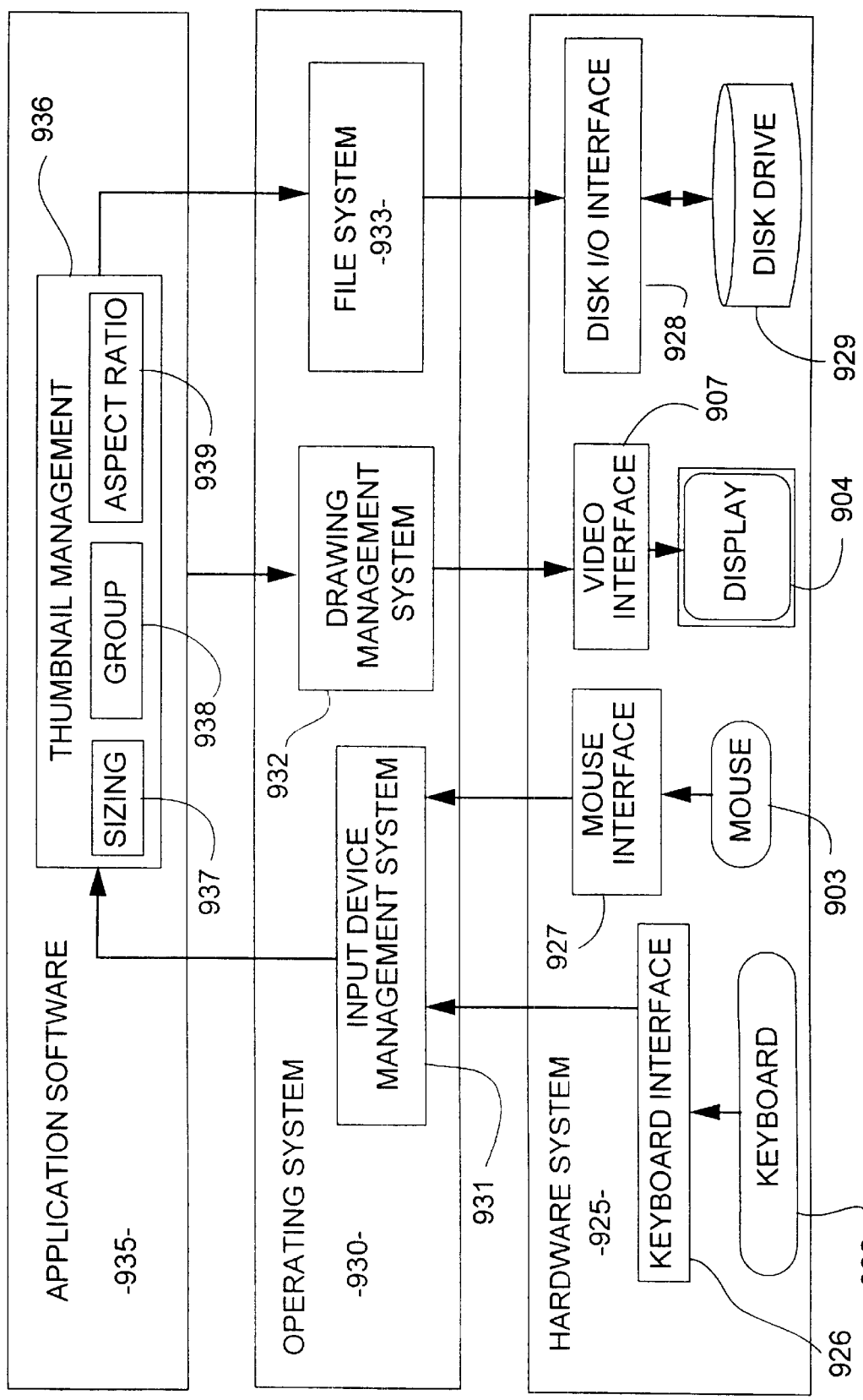
FIG. 3 illustrates a thumbnail management system including hardware and software incorporating the arrangements of FIGS. 1 and 2.

In FIG. 3, representative components of the computer system 900 are shown which include a hardware system 925, an operating system 930 and application software 935. Typically, the hardware system 925 includes the physical components of the computer system 900 described above with reference to FIGS. 1 and 2. The operating system 930 traditionally includes management software applied within the computer system 900 for performing various tasks and handling the operation of the hardware. The application software 935 includes specific routines configured for performing user desired tasks. The operating system 930 and application software 935 may reside in a permanent storage device 909 or in the memory 906 or be temporarily loaded from the device 909 to the memory storage 906.

As illustrated, the operating system 930 includes an input device management system 931 which receives user instigated control signals typically from the keyboard 902, via a keyboard interface 926, and the mouse 903 via a mouse interface 927. The input device management system 931 processes the user's commands and transfers those to the application software 935 being operated at the time, in this case being thumbnail management software 936. As seen, the thumbnail management software 936 includes an output to a file system 933 incorporated within the operating system 930. The file system 933 provides for access to files and folders which may be stored on a disk drive 929 accessed via a disk I/O interface 928 each within the hardware system. This drive 929 will be appreciated can comprise a part of the storage device 909 shown in FIG. 2. Further, the thumbnail management software 936 can output image components to a drawing management system 932 which in turn provides for the display of images on the display 904 via the video interface 907. Thus, for example, as shown in FIG. 1, the thumbnail management system may provide for the display of thumbnail images 940 which are included as components as a interactive graphical user interface to a file management system 942 operating within the computer system 900.

In this embodiment, the thumbnail management system incorporates a number of components, one being a sizing component 937 which provides for the zooming of images and in particular thumbnail images, a grouping arrangement 938 which provides for the coordination of groups of thumbnail images, and a aspect ratio component 939 which provides for the coordination of the aspect ratio of various thumbnail groups.

Fast Zooming of Images

In dealing with images in general and colour thumbnail images in particular, it is desirable for those images to be zoomed-in and zoom-out rapidly when using file management systems without overburdening the processor 905 with excessive graphical and object and/or pixel-based image manipulations.

Figure 4:
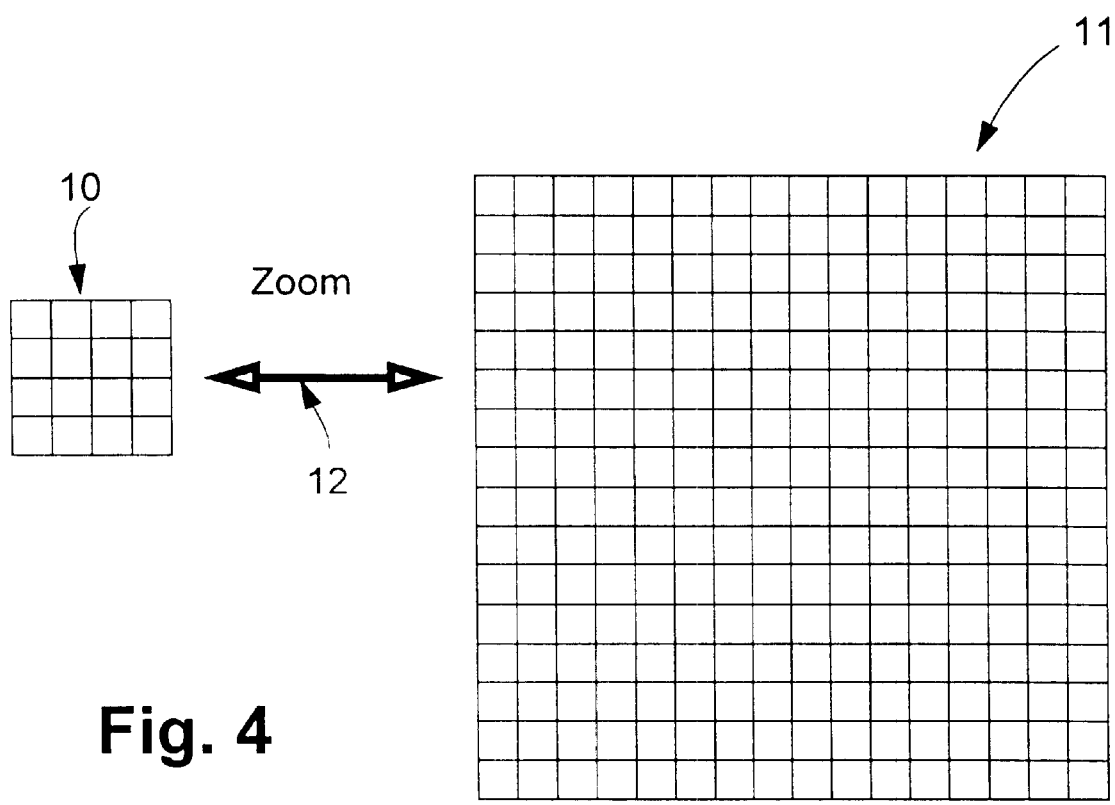
FIG. 4 illustrates an initial and final stage of zooming up or down an image in accordance with one embodiment.

Referring to FIG. 4, there is shown a first image 10 as displayed for example on the display device 904 at a first predetermined size and which is intended to be displayed as a second image 11 at a second predetermined size. In many instances, the first and second sizes are variations (typically reductions) of the true image which, when correctly and fully displayed may occupy a full video display of say 1024×768 pixels at 24 bits of RGB colour per pixel. This true image is traditionally stored on the disk storage device 909 in a compressed format, for example using the JPEG standard. Typically, the second image 11 corresponds to the first image, such as a thumbnail image, but at another resolution scale. For example as illustrated, the first image 10 is a 4×4 pixel image which is enlarged through at least one intermediate displayed size (not shown in FIG. 1) to display substantially the same image at a 16×16 pixel image resolution (ie: the image 11).

Often, a "Thumbnail" size image is referred to as being a smallest one of a number of predetermined sizes of a desired image. The first image 10 of FIG. 4, for example, is referred to herein as the "Thumbnail" size image and the second image 11 is designated the desired image. Shown in FIG. 4 is a bi-directional arrow 12 representing that a thumbnail size image 10 can be zoomed to a desired image 11 or a desired image can be zoomed to a thumbnail size image as hereinafter described.

A thumbnail size image 10 and a desired image (eg. 11) can be stored in a memory device in a compressed format (representation), and preferably the thumbnail size image and the desired image are various resolutions of a single compressed image. In various image compression representations, a multitude of resolutions can be extracted from a single image stored on a memory storage device. As an example, an image compressed through wavelet coding allows an extraction of a plurality of resolutions of the compressed image. A wavelet compressed image can be thought of as a bit stream of ones and zero. By applying a decompression algorithm to the entire bit stream, the wavelet compressed image is substantially recovered (ie. wholly decompressed). However, by applying the decompression algorithm to a first portion of the bit stream, a lower resolution version of the wavelet compressed image can be recovered and thus, by applying the decompression algorithm to a greater portion than the first portion of the bit stream, a greater resolution version than the lower resolution version can also be obtained. An example of such a wavelet compression/decompression arrangement is discussed in detail later in this specification under the heading "SWEET—A Method For Digital Image Compression". Other examples of compression techniques that can be adapted to extract a plurality of resolutions of a single compressed image include JPEG (Joint Photographic Expert Group) compression.

Figure 5A:
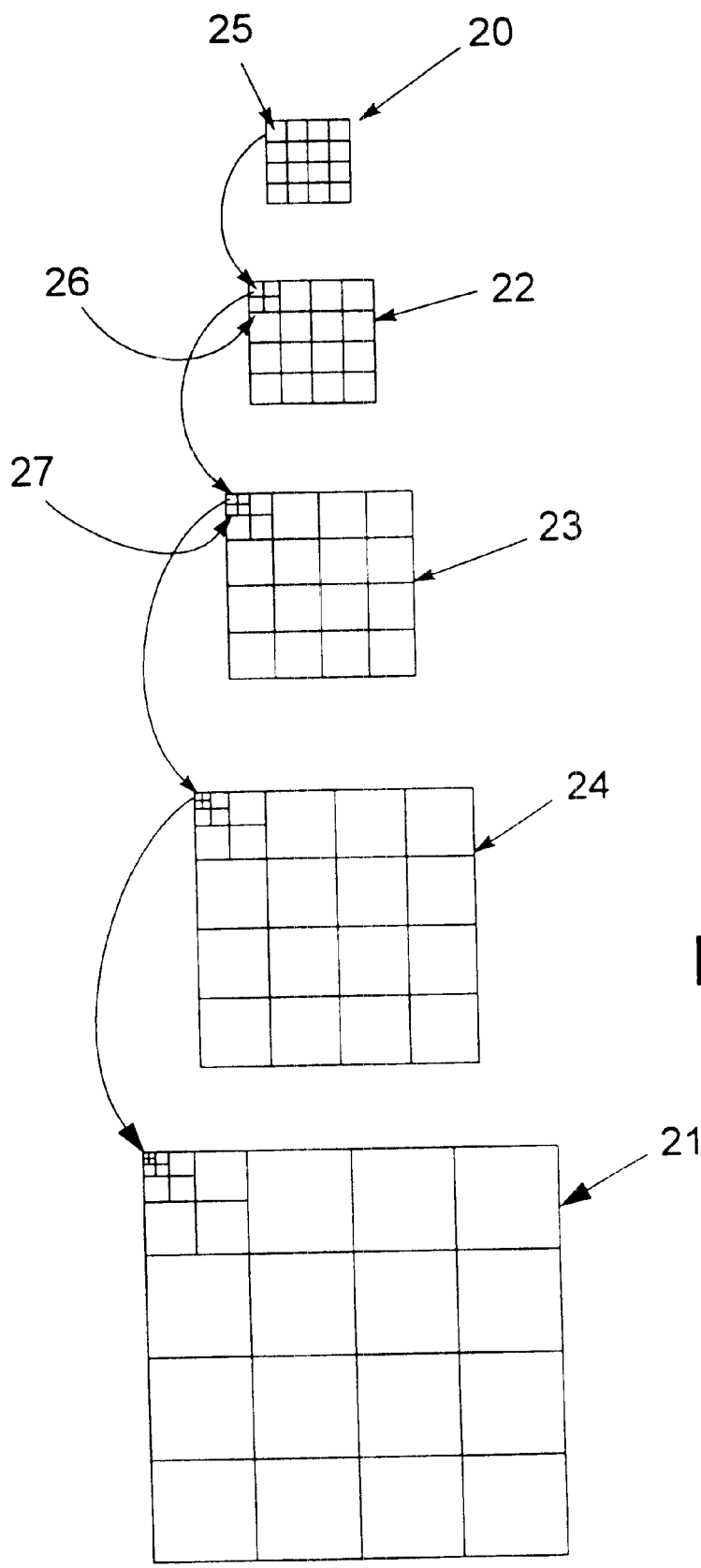
FIG. 5A shows an example of intermediate stages of an image when zooming up.

Referring to FIG. 5A, there is shown a thumbnail size image 20 which is extracted at a first resolution from a compressed true image and displayed on a display device. The thumbnail size image 20 is to be enlarged to a desired image 21 at a predetermined size greater than the thumbnail size image 20. The thumbnail size image 20 is to be enlarged through a plurality of intermediate step sizes 22,23,24 to the final predetermined size of the desired image 21. In the present example, the intermediate sizes 22,23,24 are achieved by pixel replication. Each pixel 25 of the thumbnail size image 20 is replicated (reproduced) four times to obtain a block 26 of four pixels for a first intermediate size 22 of the image 20. Each pixel of the block 26 of the first intermediate size 22 is replicated four times to produce a block 27 of four pixels of a second intermediate size 23 of the image 20. At this stage therefore, the original pixel 25 has been replicated to form sixteen pixels. This block replication process is repeated until a predetermined final size is achieved. Preferably, the predetermined final size is the same size (dimensionally) as the desired image 21. In this connection it is noted that the images 20–24 of FIG. 5A are not drawn to scale and the relative depiction of the pixels are for illustrative purposes. At this stage the desired image 21 is decompressed (extracted) from the compressed image and is displayed at the predetermined final size of the image 20. At least one of the intermediate stage sizes 22,23,24 is preferably displayed on the display device to give a visual appearance of "zooming-in" from a thumbnail size image 20 to a predetermined final size of a desired image 21.

In this fashion, zooming-in on a thumbnail can be achieved by pixel replication and is preferably performed whilst decompression to the desired size/resolution of the true image is taking place so that once instigated by the user, for example by clicking the mouse 903, the zoom "appears" to occur as the replicated stages are re-displayed. On completion of the zoom however, a more accurate, non-replicated but decompressed image is thus displayed. Thus, only one image (ie. the desired final image) need be decompressed and so only one decompression time is required to achieve and display the zoom-in effect. During that time, the user is presented with a progressively staged zoom of the rudimentary thumbnail image which, whilst not of high image quality, provides the user with a transitory progression between image sizes thus assisting in maintaining user orientation within the file/folder structure during browsing operations.

The pixel replication process described above is made with reference to a 2×2 (4 times) increase in size of the intermediate stage sizes. However, increasing the intermediate stage sizes at other than multiples of four can be optionally performed, as illustrated in FIGS. 5B and 5C.

As an example of stretching the thumbnail image 20 by pixel replication, at other than by a multiple of four, an interpolated value between two adjacent pairs of pixels in the thumbnail image 20 can be obtained and the interpolated value is replicated three times to produce three output pixels for each dimension of a first intermediate size. This results in an appearance that the thumbnail size image 20 has increased in size by 1.5 for each dimension (1.5×1.5).

Figure 5B:
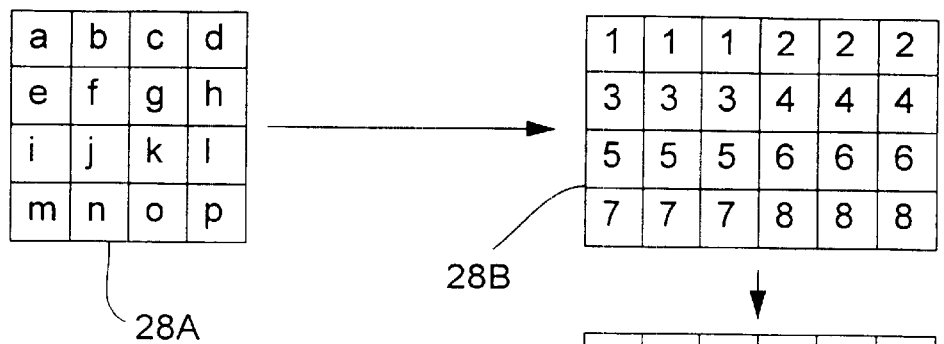
FIGS. 5B and 5C illustrate alternate arrangements for zooming up.

As seen in FIG. 5B, a 4×4 thumbnail image 28A is provided having pixel values a,b,c, . . . p. In this example, it is desired to stretch the thumbnail image 28A by a factor of 1.5 in each dimension to provide a 6×6 intermediate stage. As noted above, adjacent pairs of pixels of the thumbnail image are interpolated. In this fashion, adjacent row pairs of pixel values "a" and "b" are interpolated to provide a pixel value "1", which is then replicated three times. Similarly, pixel values "c" and "d" are interpolated to give an interpolated value of "2" which is also replicated three times. This process is applied to each adjacent pair of pixels in each row of the thumbnail image 28A to provide a 6×4 array 28B of pixel values 1 . . . 8. In a similar fashion, but working with adjacent values in each column, interpolation proceeds. Pixel values 1 and 3 are interpolated to provide a pixel value 9 which is replicated three times. This occurs for each of those pixels in that combination of values. Thus, a 9×9 array of pixels 28C is formed which comprises four interpolated values, 9, 10, 11 and 12 spread amongst 36 pixel locations.

Figure 5C:
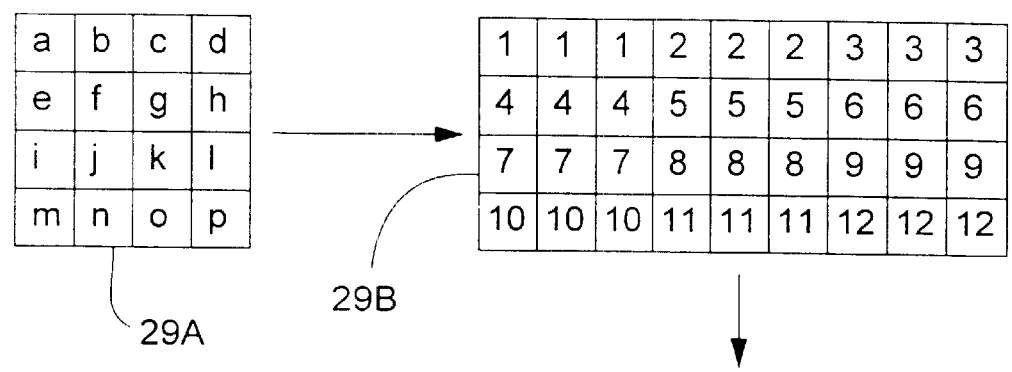

With reference to FIG. 5C, an alternative method can be provided whereby all adjacent pixels are interpolated. As shown in FIG. 5C, an input 4×4 array of pixels 29A comprising pixel values a, b, c . . . p is provided. An interpolated value "1" is obtained from input values a and b and is replicated three times as illustrated. An interpolated value 2 is obtained from adjacent pixels b and c and also replicated three times. Similarly, an interpolated value 3 is obtained from adjacent pixels c and d and also replicated. This process proceeds for each row of the input array to reveal a 9×4 array of pixels of interpolated values 29B. In a corresponding manner to the arrangement of FIG. 5B, the array of pixels 29B is further interpolated based upon the adjacency of the values such that a value 13 is obtained by interpolating values 1 and 4 and interpolated value 18 is obtained by interpolating the values 4 and 7, and so on. Thus, it will be appreciated using this approach that a 9×9 array 29C of pixels can be obtained from a 4×4 array, giving an enlargement factor of 2.25.

Further, whilst the foregoing has been described in relation to the interpolation of adjacent and pairs pixels, other mathematical processes may be applied to obtain the desired result. For example, adjacent pixel values may be averaged or blends provided between intermediate new pixels. However, it will be appreciated that the complexity of some mathematical operations will increase the computational time required to determine the intermediate zooming stages. As the intermediate zooming stages are typically quite transient, the need for higher quality is generally not necessary as all that is required is for the user to be given the impression of a particular thumbnail being enlarged by zooming-in. Thus, distortions of the image due to pixel replication/averaging etc. are tolerable as it is the original image as decompressed which results and which leaves the greatest lasting impression upon the eye of the user.

Figure 6:
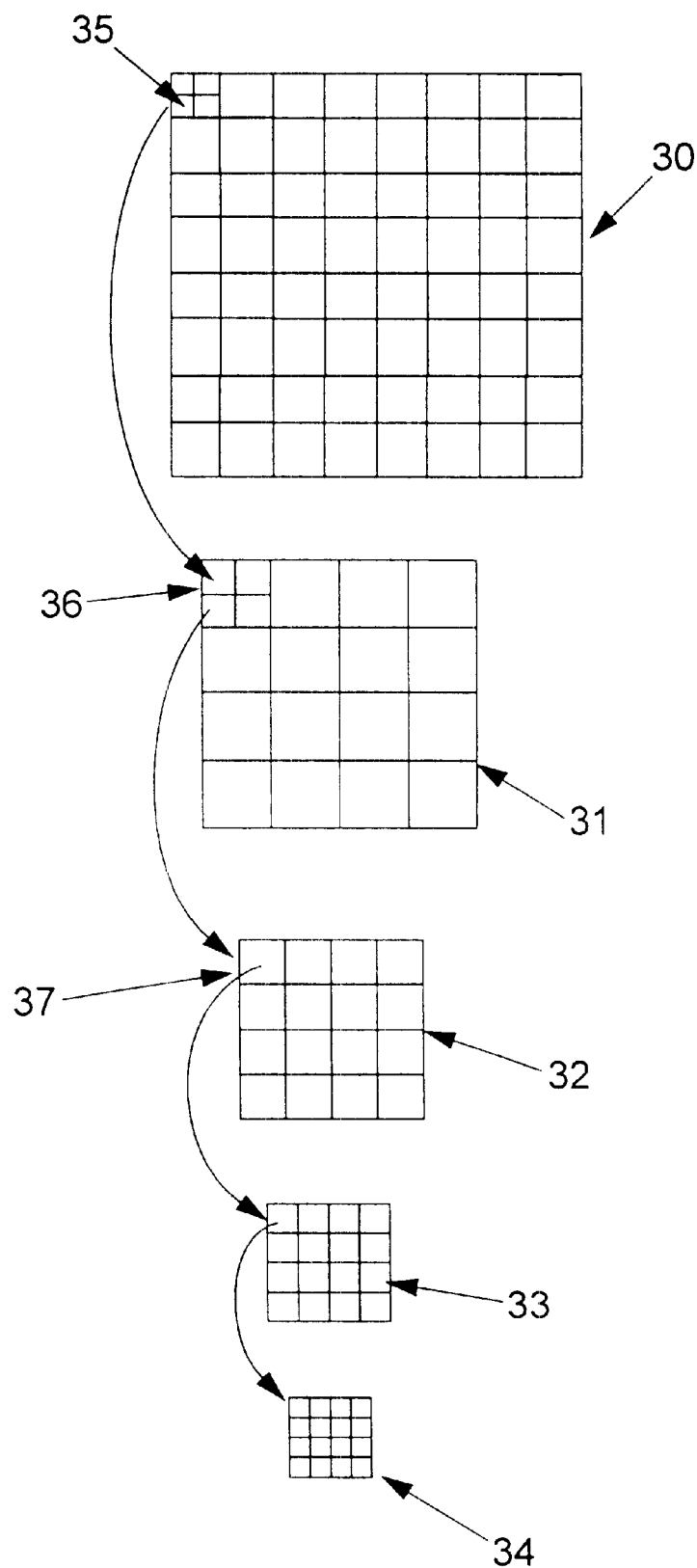
FIG. 6 illustrates an example of intermediate stages of an image when zooming down.

With reference to FIG. 6, a desired image 30 is to be contracted (shrunk in size) through a plurality of intermediate stage sizes 31,32,33 to a thumbnail size image 34, to produce a visual effect of "zooming-out". The "zooming-out" technique is achieved by decompressing the true image, from a compressed image format, to provide a desired image 30 at a first image size (dimension), and a first resolution. Then an average for a plurality of pixels 35 is obtained to produce an average pixel value, the average pixel value being assigned as a single pixel of a first intermediate stage size 31 of the desired image 30. In the illustrated example of FIG. 3, each group of four pixels 35 of the desired image 30 is averaged to produce a single pixel 36 of the first intermediate stage 31. A group of four pixels 36 of the first intermediate stage size 31 of the desired image 30 is averaged to produce a single pixel 37 of a second intermediate stage size 32. This process is repeated for each four pixel grouping of the first intermediate stage 31 until each pixel of the second intermediate stage size 32 of the desired image 30 is produced. The process of averaging four pixels to produce a pixel of a next intermediate stage size 33 is repeated until preferably a thumbnail size 34 of the desired image 30 is reached. Once the thumbnail size 34 image is substantially achieved, a low resolution image may be extracted from the compressed image and displayed at the thumbnail size 34. Again, as with the pixel replication process described with reference to FIGS. 5B and 5C, the desired image can be reduced in size by other than a factor of four. Averaging, for example, twenty-five pixels of one intermediate stage size to achieve four pixels of a next intermediate stage size, results in a reduction size ratio of 6.25:1.

An alternative option for shrinking the size of an image is to sub-sample the image. That is, one of every n number of pixels of an image is selected as a pixel to form a reduced image. The reduced image having a reduction (size) ratio n:1.

Figure 7A:
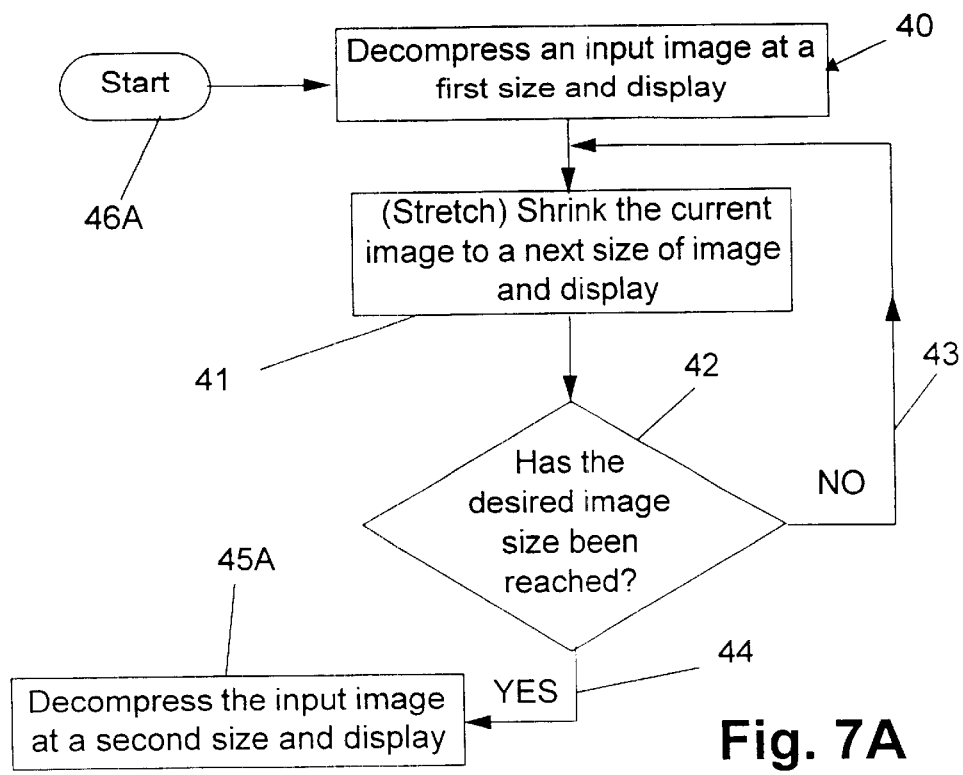
FIGS. 7A and 7B schematically illustrates the steps in the zooming process according to a generalised embodiment.

Referring now to FIG. 7A, a schematic flow diagram illustrates steps for zooming-in or zooming-out an image in accordance with the embodiments of the present invention, which are preferably implemented as software operating within the sizing module 937 of the application software 935.

As seen in FIG. 7A, commencing with a start step 46A, a first image is extracted at step 40 (decompressed) from a compressed input image and displayed on a display device at a first size and resolution. A stretch (or shrink) 41 process is applied, according to the techniques described above, and a first intermediate size of the first image is obtained. The first image is cleared from the display 904 and the first intermediate size of the first image is displayed.

A checking process 42 determines if the first intermediate size is dimensionally a size substantially similar to a predetermined image size. If the checking process determines that the predetermined size has not been reached, the stretch (or shrink) process 41 is again applied 43 to the current (first intermediate) image to result in a second intermediate stage size of the first image which is displayed in place of the first predetermined size. The process is continued until the checking procedure 42 determines that the predetermined image size has been, in substance, reached at step 44. At this stage, the procedure may stop, resulting in the continued display of the stretched/shrank image at the desired size. Preferably however, a second image being a second size and resolution of the first image is decompressed (extracted) from the compressed input image and displayed on the display device. The stretch process 41 is used when zooming-in, and the shrink process 41 is used when zooming-out. It follows that the stretch or shrink process 41 cannot be used alternatively to the extent that such would produce an absurd outcome in either a zooming-in or zooming-out of an image.

Figure 7B:
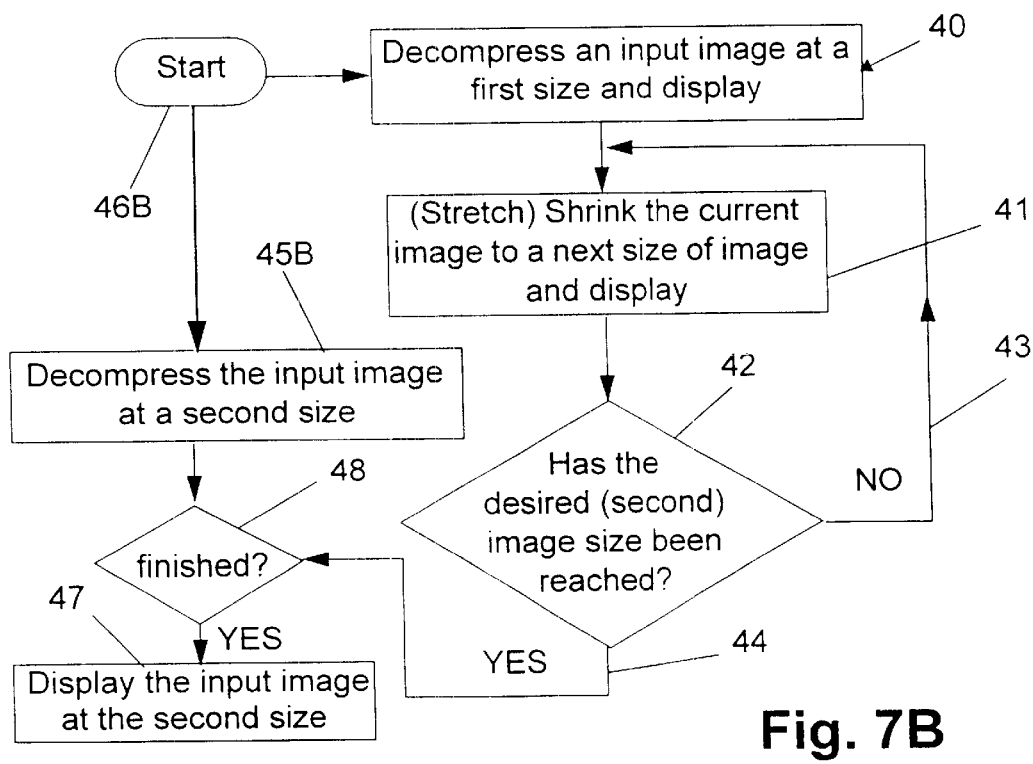

In the embodiment of FIG. 7B, a similar process to that of FIG. 7A is illustrated but where a start step 46B instigates both step 40 to decompress and display the input image at the first size, and also step 45B to commence the decompression of the input image. In this fashion both decompression and low quality stretching/shrinking occur simultaneously and the second image is displayed after the second image size of the stretched/shrunk image is obtained and decompression has been finished, as assessed by decision step 48.

In each of the examples of FIGS. 7A and 7B, the input image need not be a fully compressed true image but may comprise a partly compressed image or indeed a utility version thereof such as a thumbnail or any of the intermediate stages described above.

It will be apparent from the above that zooming, both in and out, of images can be performed in such a manner to display a staged progression of the zoom process thus aiding user orientation, but without the need for a complex compression to occur at each display stage. The stretching/shrinking of the intermediate (and possibly final) stages occupies substantially fewer computational resources within the computer system 900 and thus can be performed faster than incremental decompression. Thus image browsing operations, particularly in file management systems are facilitated and enhanced by speed and ease of use, whilst maintaining the ability for full image reproduction.

Aspect Ratio Zooming of Thumbnails

This embodiment is directed to a method, apparatus, system and computer program product for aspect-ratio zooming of thumbnails used for image browsing using a computer. This essentially separates the tasks of browsing content and assessing content, thereby eliminating the need to compromise on image thumbnail size. The process of aspect-ratio zooming represents a new concept in image browsing and provides a unique solution to the problems of navigation and orientation in vast image spaces.

Using the aspect ratio zooming process of the preferred embodiment, all thumbnails within the search domain are scaled to fit within the available display area. This facilitates the global browsing of content. Thumbnails of interest are then scaled up as required. This facilitates more detailed assessment of image content.

The aspect ratio zooming process of the preferred embodiment enables implementation of a unique image browsing system that provides a consistent spatial representation of the entire search domain, support for image groupings within a hierarchical, user defined structure, and rapid traversal between browsing content and detailed assessment of content. An important aspect of this aspect ratio zooming process is the process of recursively laying out image display areas at fixed aspect ratios, where aspect ratio is defined as the ratio of the width of the image display area to the height of the image display area. Maintaining a fixed aspect ratio for image display areas overcomes the problems of user navigation and orientation within the entire image space, as well as the technological problems associated with scaling images up and down at adequate speed so as not to inhibit the browsing process.

The apparatus for aspect-ratio zooming of thumbnails used for image browsing in accordance with this method is preferably implemented using software executing on a personal computer, such as the system shown in FIGS. 1, 2 and 3 for example. In particular, the software running on the computer lays out one or more groups of thumbnails of the digital images in containment areas having a predetermined aspect ratio corresponding to that of the largest possible available display area of a display device, and scaling the thumbnails, preferably as large as possible, to fit within the respective containment area.

Preferably, the apparatus is implemented with the aspect ratio zooming process embodied as software or a computer program (eg, within a browser application) recorded on a computer readable medium and loaded into the computer system 900 from the computer readable medium. Examples of suitable computer readable media include a floppy disk, magnetic tape, a hard disc drive, a ROM or integrated circuit, a magneto-optical disk, a radio or infra-red transmission channel between the computer and another device, a computer readable card such as a PCMCIA card, a network connection to another computer or networked device, and the Internet and Intranets including e-mail transmissions and information recorded on websites and the like. The foregoing are merely exemplary of relevant computer readable media. Other computer readable mediums may be practiced without departing from the scope and spirit of the invention.

Figure 15:
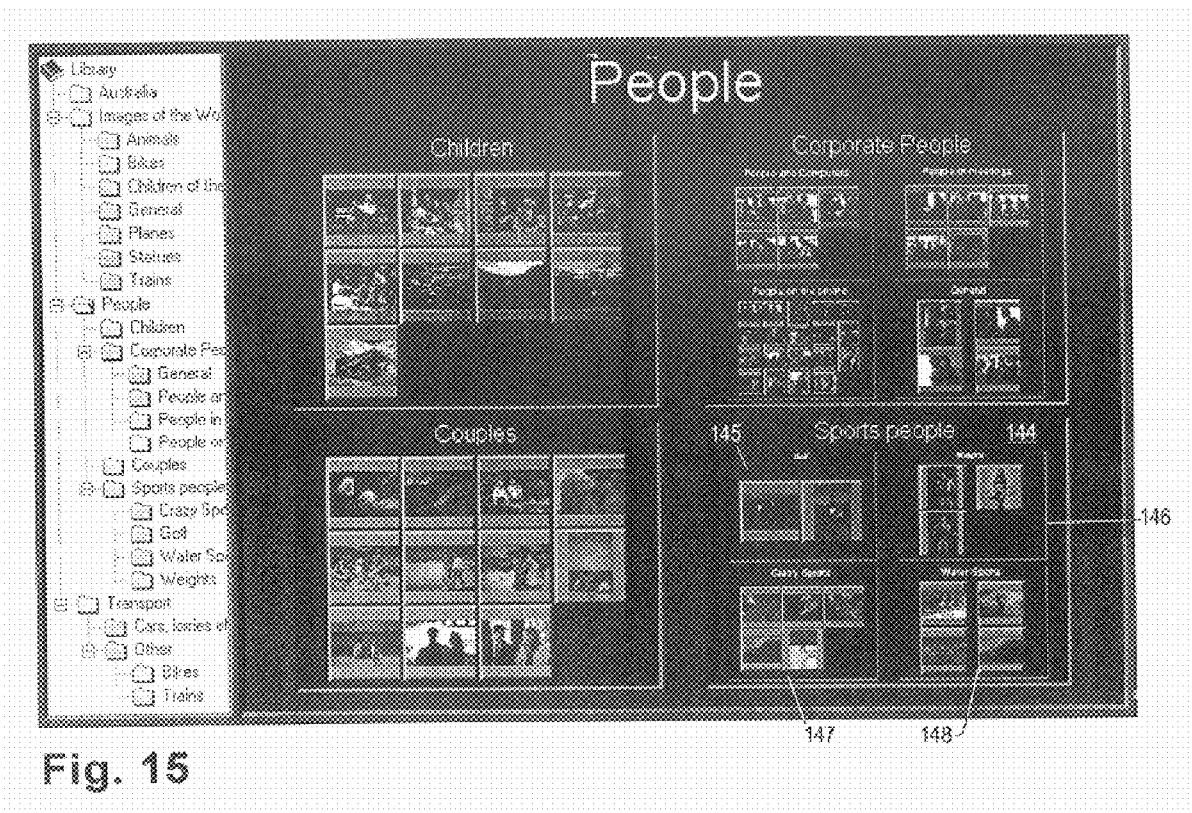
FIG. 15 illustrates aspect ratio zooming of one of the containment areas of FIG. 14, which in turn comprises (sub) groups of thumbnails organized in (sub) containment areas having the same aspect ratio as both the parent containment area and the largest displayable area.
Figure 16:
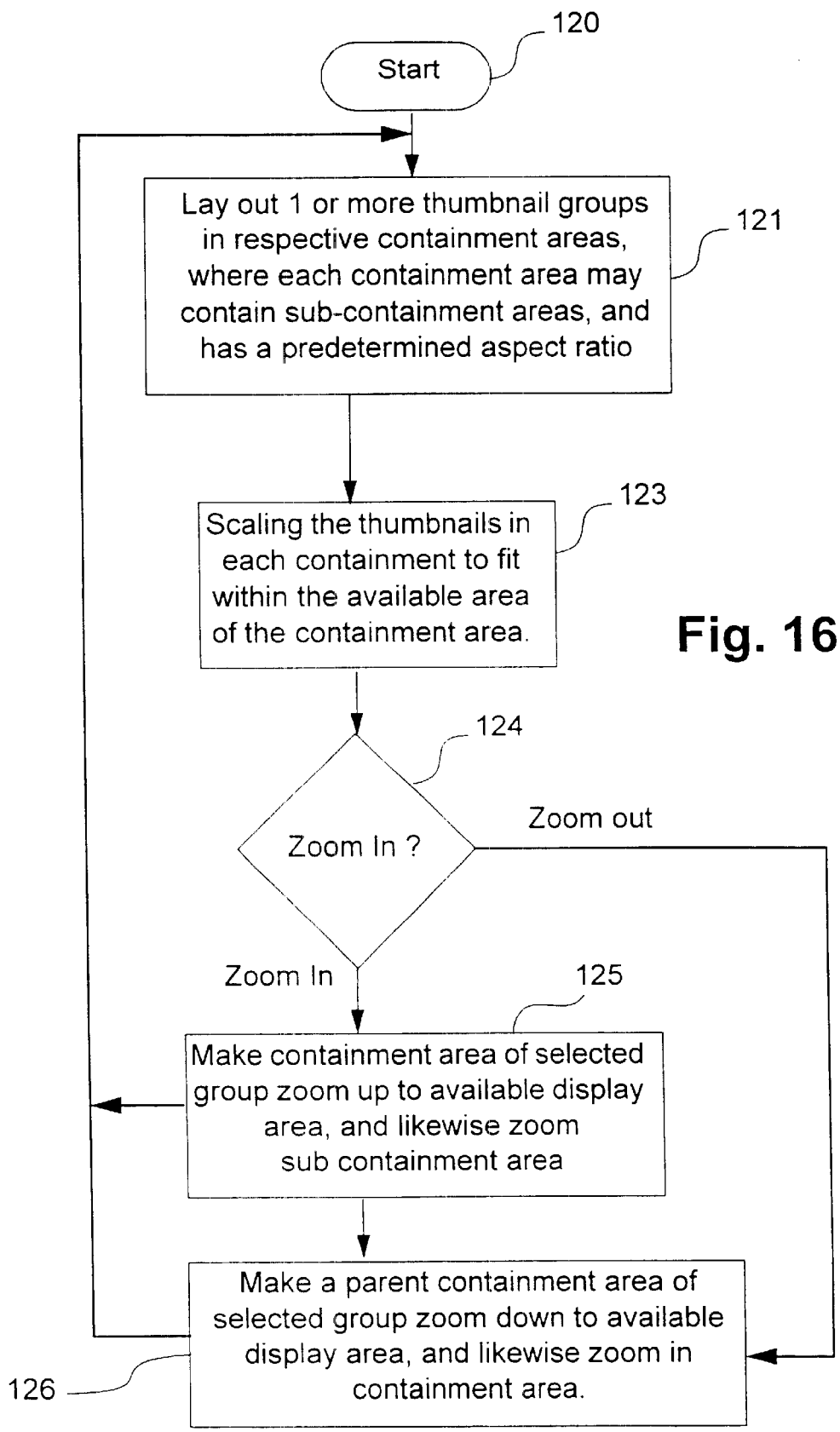
FIG. 16 is a flow diagram illustrating the process according to the preferred embodiment.

FIG. 16 is a flow diagram illustrating embodiments of the aspect ratio zooming process 120 preferably implemented by the software module 939 of FIG. 3. Processing commences at step 121 in which the thumbnails, organized in one or more groups, are laid out in respective containment areas. Each containment area may in turn contain (sub) containment areas and has a predetermined aspect ratio. The aspect ratio is the ratio of the width to the height of the largest displayable area available (which may be the entire screen, a portion of the screen, or a window, for example) on the display device. This is described hereinafter in greater detail with reference to the FIGS. 8 to 15. In step 123, the thumbnails are scaled in each containment area to fit with the available area of the containment area. It will be appreciated that this forms a hierarchical, tree-like structure of sorts, in which one containment area may form the uppermost containment area within the displayable area. Steps 121 and 123 constitute the essential steps of this embodiment. The process may constitute these steps alone, but optionally also include steps 124 to 126.

Preferably, a check is made in decision block 124 to determine if a user selected containment area is to be zoomed in. If decision block 124 returns true (zoom-in), processing continues at step 125. In step 125, the selected containment area is enlarged (zoomed up) to the available display area, and this is likewise carried out for any (sub) containment areas with respect to the relevant parent containment areas. Execution then continues at step 121, where the aspect ratio zooming process is applied in steps 121 and 123.

Otherwise, if decision block 124 returns false (zoom-out), processing continues at step 126. In this step, the reverse or complementary process of step 125 is carried before processing returns to step 121. That is, a parent containment area of the selected group is set to the available display area, and likewise the selected containment area is reduced in size, along with its thumbnails.

Figure 8:
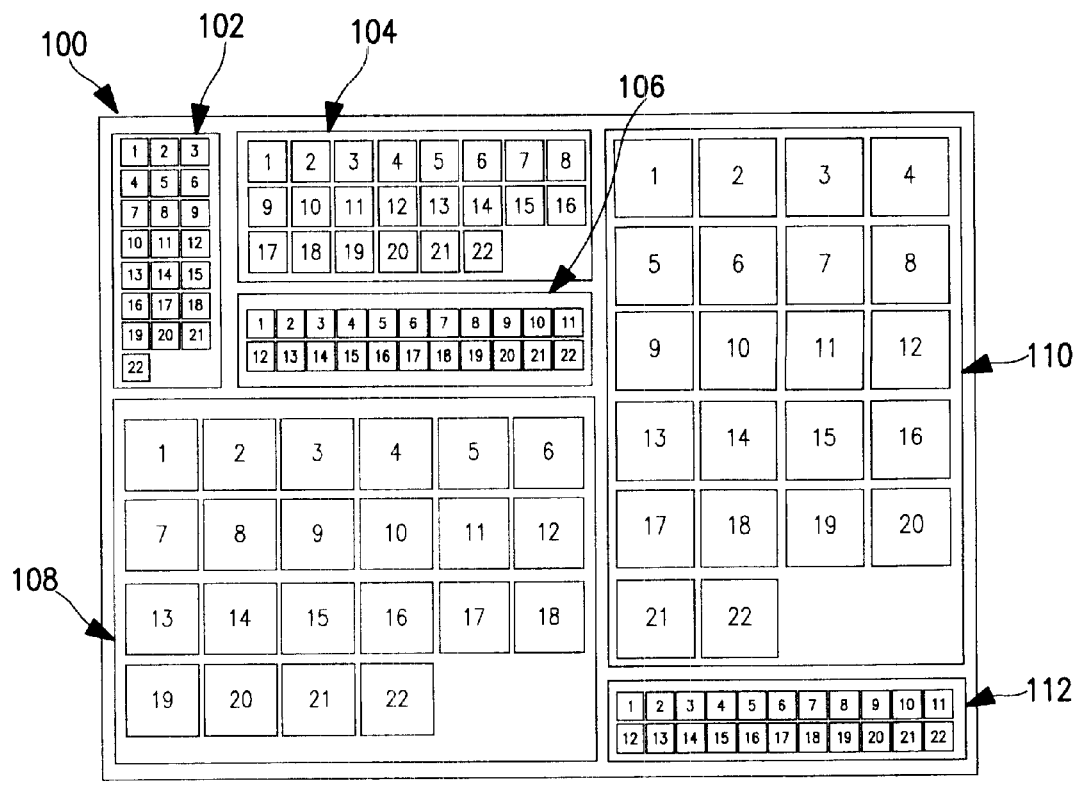
FIG. 8 is a schematic illustration of six groups of twenty-two thumbnails, each group in a respective containment area, in which one of the containment areas is scaled and laid out in accordance with the aspect ratio zooming process of an embodiment.

The process of aspect ratio zooming-in this embodiment overcomes problems of user navigation and orientation within the image space. FIG. 8 shows an example of an entire image space containing a total of 132 image thumbnails divided into six distinct groups. The image thumbnails are represented by grey numbered squares. A primary containment area 100 represents the entire space available for the display of image thumbnails, for example, on a video display monitor. In general, the primary containment area defines the aspect ratio of the display. Containment areas 102, 104, 106, 108, 110 and 112 provide visual segregation for the six groups of images within the image space. For this example, each group contains 22 image thumbnails and displayed at uniform size and scaled to the largest possible size that permits the group to fit within the respective containment area. As seen in FIG. 8, containment area 108 is the only area that has the same aspect ratio as the primary containment area 100, in this case a ratio of about 1.320.

During normal browsing or searching activity, users typically scan the entire search domain (in this case, the entire image space) and then refine their search by choosing to take a closer look at perceived areas of interest. In this case, the user may choose to zoom-in on the images displayed in one of the containment areas. Containment area 108 as illustrated has been laid out in accordance with the process of the preferred embodiment. Only the images in containment area 108 (which has the same aspect ratio as the primary containment area 100) can be zoomed up to fill the primary containment area 100 (ie., the entire space available for the display of images) without causing orientation problems for users.

FIG. 9 illustrates the process of aspect ratio zooming the thumbnails of containment area 108, having the same aspect ratio as the largest displayable area, in accordance with the process of the preferred embodiment. Thus, the images in containment area 108 can be enlarged to fill the primary containment area 100 without being rearranged. This is important since it provides a consistent spatial representation of the image space. In contrast, zooming up one of the other image containment areas 102, 104, 106, 110 or 112 of FIG. 8 (so that the image thumbnails within that group are made as large as possible to fill the primary containment area 100) results in the images being rearranged as is described hereinafter with reference to FIG. 10.

Figure 10:
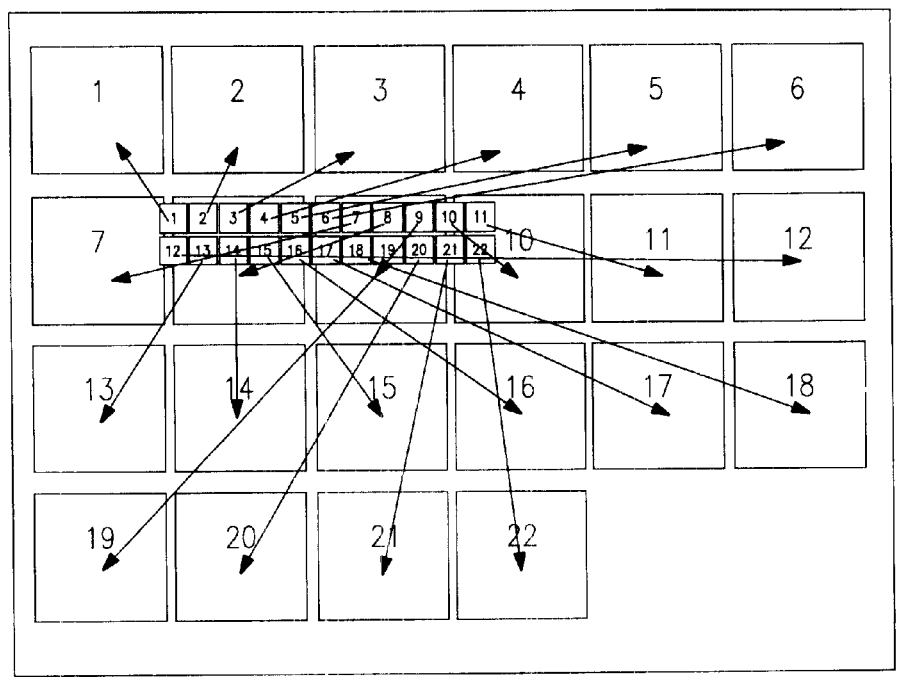
FIGS. 10 to 12 illustrate disadvantageous aspects of using containment areas having different aspect ratios than that of the largest displayable area.
Figure 11:
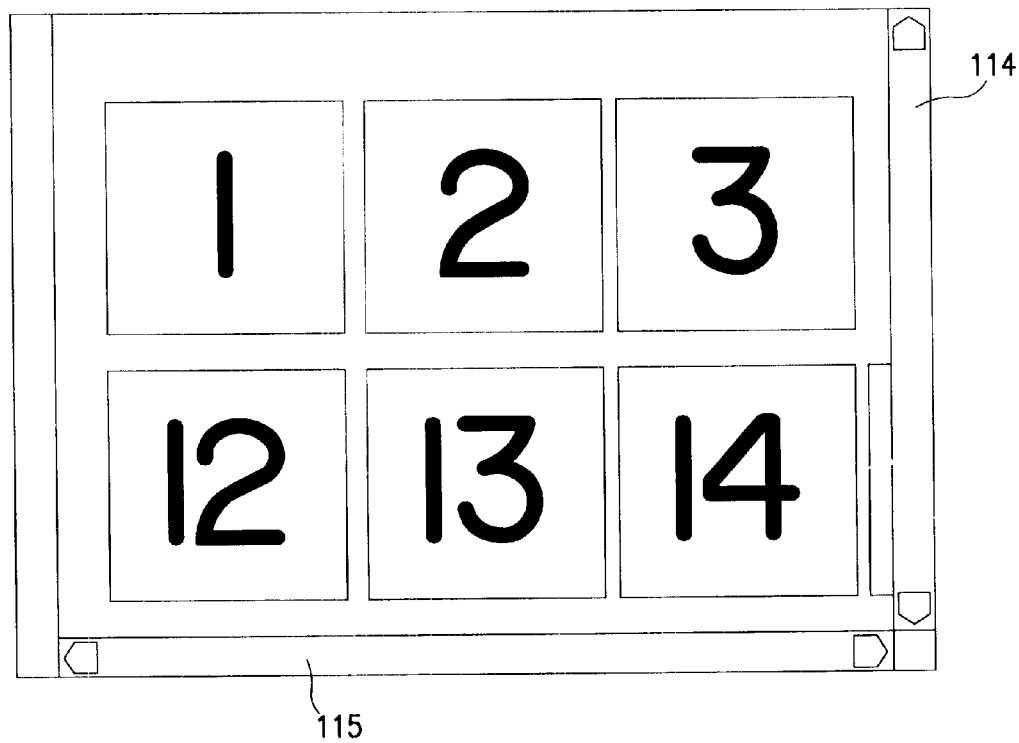
Figure 12:
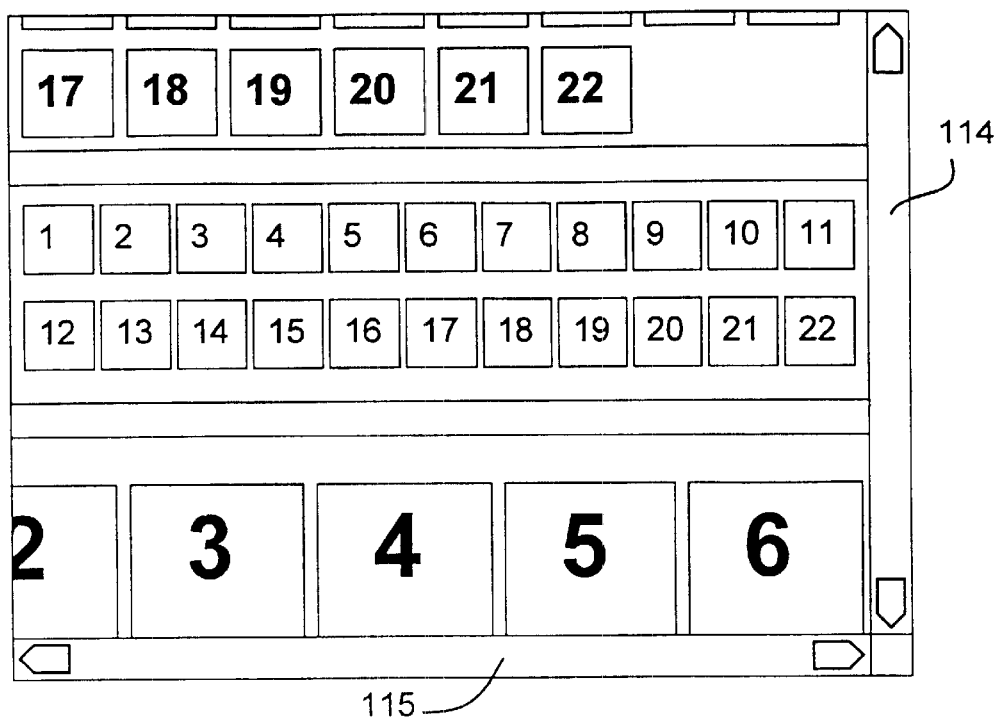

FIG. 10 shows how the images in containment area 106 have to be rearranged if they are zoomed up to fill the primary containment area 100. Alternative methods of zooming up a containment area with a different aspect ratio to the primary containment area 100 are shown in FIGS. 11 and 12. Both of these necessitate the use of scroll bars 114,115 (or similar controls) and lead to orientation and navigational problems for users. The useability problems associated with using scroll bars are known.

Figure 13:
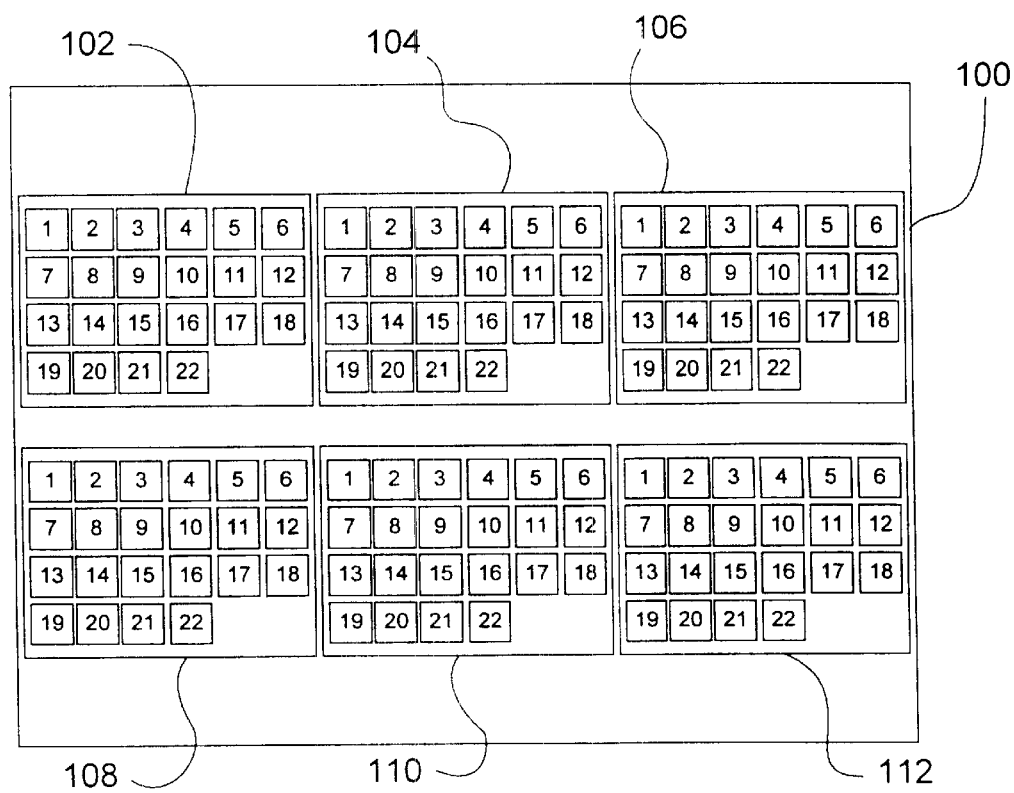
FIG. 13 is a schematic illustration of the layout and scaling of several groups of thumbnails of FIG. 8 in respective containment areas having the same aspect ratio as the largest displayable area in accordance with the process of an embodiment.

FIG. 13 shows how the thumbnails of FIG. 8 can be rearranged in accordance with the aspect ratio zooming process of the preferred embodiment. Each of the containment areas 102 to 112 of the six thumbnail groupings is laid out to have the same aspect ratio as the principal containment area 100. In this manner, all six image groupings are displayed in areas of the same aspect ratio as the primary containment area.

Figure 14:
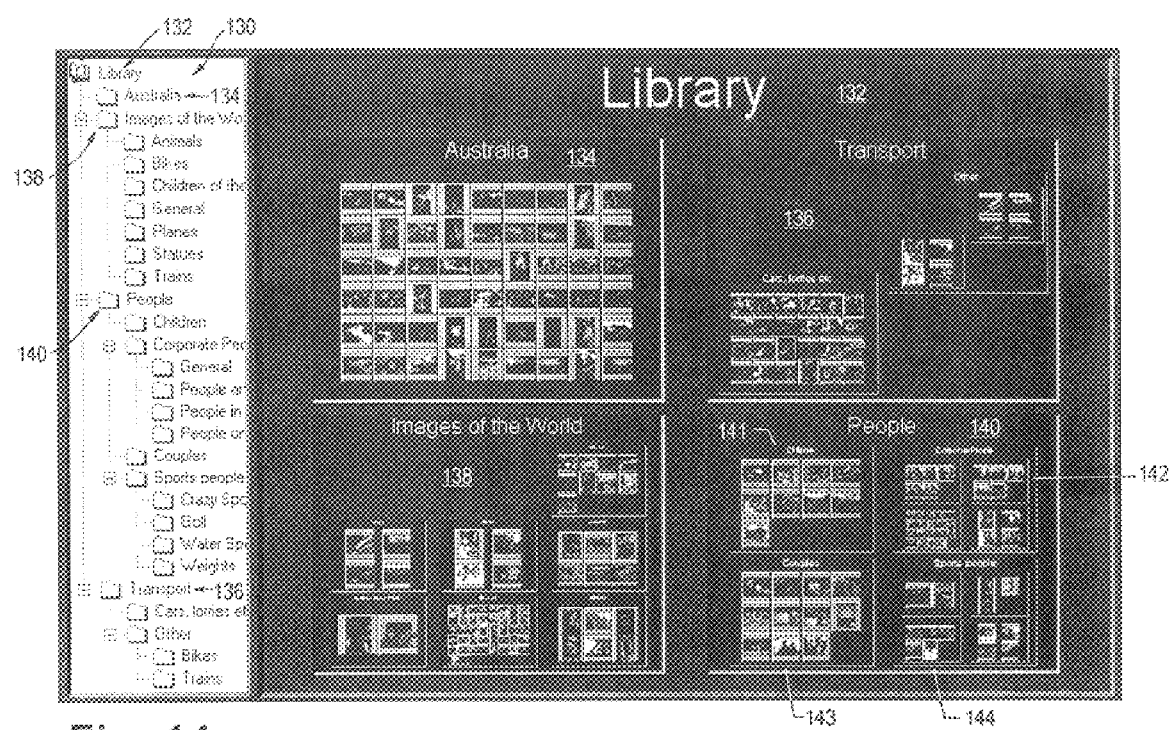
FIG. 14 is an illustrative example of four groups of thumbnails organised in respective containment areas, each having the same aspect ratio as the largest displayable area, in accordance with the process of the an embodiment.

FIG. 14 illustrates an example of the aspect ratio zooming process extended so that image containment areas with fixed aspect ratios can display other image containment areas with the same aspect ratio. The containment areas containing these groupings may also in turn comprise (sub) containment areas. Thus, a hierarchical structure of containment areas and (sub) containment areas is provided. The structure of the image space is depicted in the (Windows or Internet) "Explorer" (TM) type tree view 130 on the left hand side of the screenshot or image. Each of the containment areas is depicted as a folder in the tree. The largest displayable area or principal containment area is labelled "Library" 132, and it contains four groupings of thumbnails labelled "Australia" 134, "Transport" 136, "Images of the World" 138, and "People" 140.

Whereas the containment area 134 labelled "Australia" contains only image thumbnails, the containment area 140 for "People" contains further image thumbnail groupings ("Children" 141, "Corporate people" 142, "Couples" 143, "Sports people" 144). This equally applies to the containment areas "Transport" and "Images of the World". In this way, the aspect ratio zooming supports the meaningful and concurrent display of an entire image space.

FIG. 15 illustrates the enlargement of the "People" containment area 140 so as to fill the available display space (formerly labelled "Library"). Having had a closer look at the contents of the "People" group, a user can choose to "zoom-in" further on another containment area (for example, "Sports people" 144 contains four further groups 145–148), or zoom back out. In this way, users are able to reduce or enlarge any containment area to fill the display space available while maintaining context and spatial reference.

The process of aspect ratio zooming according to the preferred embodiment is advantageous in that it overcomes disadvantages of the prior art. This includes the technological problems associated with scaling images up and down at adequate speed. Zooming (moving from displaying a group of images and/or containment areas, to displaying the contents of one containment area) can be performed in a number of ways:

1) Switching displays: simply switch from the initial state to the zoomed in state, which is advantageous in that it is very fast;

2) Zooming with outlines: drawing the outline of each image or containment area being zoomed at each zoom step, which is also very fast, and gives the user some feel for the zoom process;

3) Accurate zooming: performing a number of intermediate zoom steps, and redrawing the display accurately at each step, which is advantageous in that each zoom step looks appealing;

4) Bitmap scaling: scaling up (or down) a bitmap of the whole (or part of) the primary containment area 100, to each zoom step, and then accurately redrawing at the end of the zoom; this is very fast and gives the user a good feel for the zoom.

"Scaling the bitmap" in above item (4) is easily performed if the bitmap of the area being zoomed into has the same aspect ratio as the viewing area. If it does not have the same aspect ratio, the zoom steps do not correspond with the final resulting display. An example of such zooming is the fast zoom described above with reference to FIGS. 4 to 7B.

After the last zoom step, the display contains the "scaled bitmap". By drawing the background quickly, but leaving the scaled images untouched, a good approximation of the final display may be obtained. Each image may be redrawn properly one at a time while allowing the user to interact with the program. The longer the user waits, the better is the quality of the display (until all the images are redrawn).

A further and preferred implementation is illustrated in FIGS. 17A–17D which combines aspect ratio zooming with an alternative implementation of the previously described fast zooming of thumbnails. In particular, the present inventors have determined that image-by-image thumbnail stretching as may be required when zooming a containment area can be excessively time consuming particularly with the need to redraw the background of the containment area with each intermediate stage. This difficulty is overcome by selecting the entire containment area (window) and processing that area as if it were a single input image whereby the entire containment area is stretched/shrunk including text and images, and when the final size is obtained using the fast zooming process previously described, the entire containment area/window is redrawn including background, title and individual images. This is depicted in FIGS. 17A–17D where it will be appreciated that FIG. 17A is a schematic representation of the library window 132 seen previously in FIG. 14. In this embodiment, it is desired to zoom-in upon the "people" containment area 140 to reveal the image shown in FIG. 15. FIG. 17A shows the library display in its initial form prior to the commencement of the zoom. In FIG. 17B, the people containment area 140 has been zoomed to a first intermediate size and is shown illustrated commencing to occlude the other containment areas. FIG. 17C shows a farther transitional stage where the people containment area 140 substantially occludes the remainder as the zoom proceeds. FIG. 17D shows the configuration of the display at the completion of the zoom. In the intermediate displays of FIG. 17B and FIG. 17C the people containment area 140 is displayed using pixels replicated from the people containment area shown in FIG. 17A. In FIG. 17D however, each of the individual thumbnails and sub-containment areas 141–144 are decompressed to reveal the desired higher quality images.

The process of aspect ratio zooming according to the preferred embodiment is also advantageous in that it provides a new and superior image browsing system given accepted wisdom regarding database navigation and the principles of browsing. The process also complies with the guiding principle for the design of database navigational systems, which is to make users aware of the entire contents of the search domain and to facilitate rapid examination of any individual item in greater detail (eg, see Spence, R. and Apperly, M. D. (1982) "Database Navigation: An Office Environment For the Professional", *Behaviour and Information Technology*, 1, 1, pp 43–54).

The process also exploits the remarkable (and well documented) spatial memory and visual scanning capabilities of humans to assist in the browsing process (rather than simply relying on recall through prior classification). Still further, it is advantageous in that it provides continual reinforcement as to the structure and layout of the image space which, albeit unconscious, is generally considered to enhance spatial memory. It also capitalises on the almost limitless capacity of human recognition memory (eg, see Standing, L. (1973) "Learning 10,000 Pictures", *Quarterly Journal of Experimental Psychology*, 25, pp. 207–222) and the highly developed skills for pattern recognition by displaying all thumbnails in the search domain at maximum size possible while maintaining context and providing consistent spatial reference.

While users may not always be happy making judgments about the content of an image from a thumbnail smaller than 80×80 pixels, image thumbnails as small as small as 6×6 pixels can nonetheless be easily distinguished from each other. Further, in combination with foreknowledge of the image content, the human perceptual system is able to recognise images from thumbnails displayed as small as 14×14 pixels. Consequently, for the purposes of browsing (as distinct from assessing content) considerable value can be achieved by displaying thumbnails at much smaller sizes than they are displayed using prior art techniques.

Compressing and Scaling Thumbnails

This embodiment is directed to a method, apparatus, and computer program product for encoding and scaling thumbnails. That is, image thumbnails are generated at varying resolutions or sizes. The various resolutions or sizes may be predetermined, which can be adjusted to a different size than that of the predetermined one. Thumbnails provided in accordance with the preferred embodiment are particularly useful in applications for image browsers used to navigate large databases of digital images. While the use of thumbnails produced in accordance with the preferred embodiment has particular application to browsing image databases, it will be apparent to those skilled in the art that such a technique can be advantageously practiced in other applications without departing from the scope and spirit of the invention. In the following description, numerous specific details, such as the size of image thumbnails, application software embodying the process, screen displays, arrangements of thumbnails, etc. are described in detail to provide a more thorough description of the present invention. It will be apparent, however, to one skilled in the art that the present invention may be practiced without these specific details. In other instances, well-known features are not described in detail so as not to unnecessarily obscure the present invention.

Overview

The process of compressing and scaling a thumbnail in accordance with the preferred embodiment enables the display of many small thumbnails or image icons on the one hand, when necessary, and allows such thumbnails to also be displayed as large as possible on the other hand. In a browsing application where elements of a database are represented by thumbnails, the encoding and scaling process can be advantageously employed To optimally meet the noted trade-off, thumbnails preferably fill a display window when displayed and do not unnecessarily leave significant portions of a display window unused. As a rough approximation, the thumbnails fill a constant "image data" regardless of the number of thumbnails displayed. If there are many images to be displayed, the thumbnails are made small, while if there are only a few thumbnails to be displayed they are made larger. The idea of a constant image area is only approximate as the amount of area depends on the size of the border areas which change with image icon size and number.

The process of the preferred embodiment also provides compression to minimise storage requirements for such thumbnails. Even small images require a significant amount of space and hence a large number of thumbnails can use a significant amount of memory. Compression is also desired for memory efficiency. It is often desirable that many thumbnails are stored in memory, rather than on disk, for faster access. Memory is normally at a premium and therefore the process of the preferred embodiment stores the thumbnails in memory in a compressed format.

In this process, a hierarchical image icon representation is used to meet the "constant area"/variable image size requirement. To use compression, relatively fast decompression is required so that the image icons are displayed in an acceptable amount of time. To display a "constant area" of images in substantially the same amount of time, the process of the preferred embodiment provides a decompression time that is substantially proportional to the size of the image. By displaying the different types of "constant area" image sets in the same amount of time, the process ensures that each image set is displayed in an acceptable amount of time. If each image set is displayed in substantially the same amount of time, a "worst case" display time problem can be minimised or eliminated using this process. Thus, all image sets are displayed as quickly as possible.

To meet the foregoing requirements, the process of the preferred embodiment utilises an efficient hierarchical discrete wavelet transform (DWT) coded representation. DWT compression techniques offer good image compression, and the coding of the subbands produced by the DWT in terms of increasing frequency offers a hierarchical representation without substantially sacrificing compression efficiency (ie., amount of compression). Still further, coding of the subbands in such an order offers decompression times proportional to the size of the decoded image, and independent of the size of the original image. Using a suitable DWT compressed representation also has another advantage. The image icons can actually be decompressed at a size greater than the size of the original compressed image icon. This is simply achieved using the inverse DWT engine within the decompression code. The process of the preferred embodiment utilises the SWEET compression technique which is particularly suitable for this compression application. The SWEET technique is disclosed in Australian Provisional Application No. PO 4728 filed on Jan. 22, 1997 and entitled "A Method for Digital Image Compression", the relevant disclosure of which is reproduced below under a corresponding sub-heading. Compression and decompression using SWEET are both very fast. Also, the subbands are coded in order of increasing frequency and independently. Further, SWEET provides high compression efficiency.

Because the process of the preferred embodiment uses a discrete wavelet transform coding, it can decode small resolution versions of images with a decoding time linearly dependent on the size of the decoded image. Therefore, a constant image "area" can be decoded independent of the size of the images that constitute an area. An efficient hierarchical DWT representation meets the desired requirements of fast decompression and hierarchical size decompression with decompression speed substantially proportional to the size of the decoded image. Further, this hierarchical representation can be achieved without sacrificing compression efficiency and in fact compression can be obtained competitive with state of the art techniques. Finally, using a DWT representation, the inverse DWT engine can be used to display the image icons at a size larger than the original compressed size.

Exemplary Environment Using Thumbnails

As discussed above FIG. 13 is a block diagram illustrating six groups 102–112 of thumbnails displayed on a display device 100 (eg., a computer display monitor). Each of the exemplary groups 102–112 contains 22 thumbnails numbered accordingly. While particular groupings and numbers of thumbnails are shown, the embodiments of the invention are not so limited, and the example of FIG. 13 is provided for ease of description with each thumbnail depicted as a grey-filled block.

As discussed above, each thumbnail is a visual representation, preferably of a corresponding image file. In the case of image files, each image file has a reference to it as well as a corresponding thumbnail. The thumbnails or image icons provide an indication of the image they represent, and are small versions of the images. References to the image files are stored in a database (although this could easily be extended to non-image files), and may be acquired from a file system, or from an input device such as a digital camera or a scanner. When an image file is added to the database system, a reference to the image file is stored, and a thumbnail is created for the image. While the preferred embodiment uses thumbnails that represent still images, the invention is not limited to this particular application. Instead, thumbnails using the method of the preferred embodiment described below can be used to represent other things including video sequences, a document for which an icon can be made, etc.

As shown in the screenshot of FIG. 14, each of the thumbnails is a graphical representation of an image. Dependent upon the particular application involved, the arrangement of the thumbnails can reflect a number of things: the semi-hierarchical categorisation of the images into folders (a directed acyclic graph with a single root, but only the leaves, ie., the images themselves, can be multiply referenced); a display of the images brought into the system but not yet categorised; or the results of some automated search through the images in the system. Large numbers of images may be stored in the system. For example, image databases may not uncommonly contain ten thousand images. In fact the only limitation on the size of the image database is the storage capacity and performance of the computer being used.

In this example, the top-level display logically shows all the categorised images. For each internal node of the graph (each folder) shown on the left-hand side of FIG. 14, a rectangular array of the thumbnails is displayed in the top left corner and at the same size for all the leaves directly connected to this node. In the remaining space, an outline is laid out of every internal node that depends from this node. This process is repeated recursively (although at smaller scales) within each outline, ie. for each internal node. The hierarchy of thumbnails is navigated by zooming-into and out of the folders in the exemplary application. Because a directed acyclic graph is being represented, a given image may also appear several times in the hierarchy. Since the places where the image appears may be at different levels of the hierarchy, several thumbnails may simultaneously need to be displayed for the image at different sizes.

Encoding and Scaling Process of Preferred Embodiment

Figure 18:
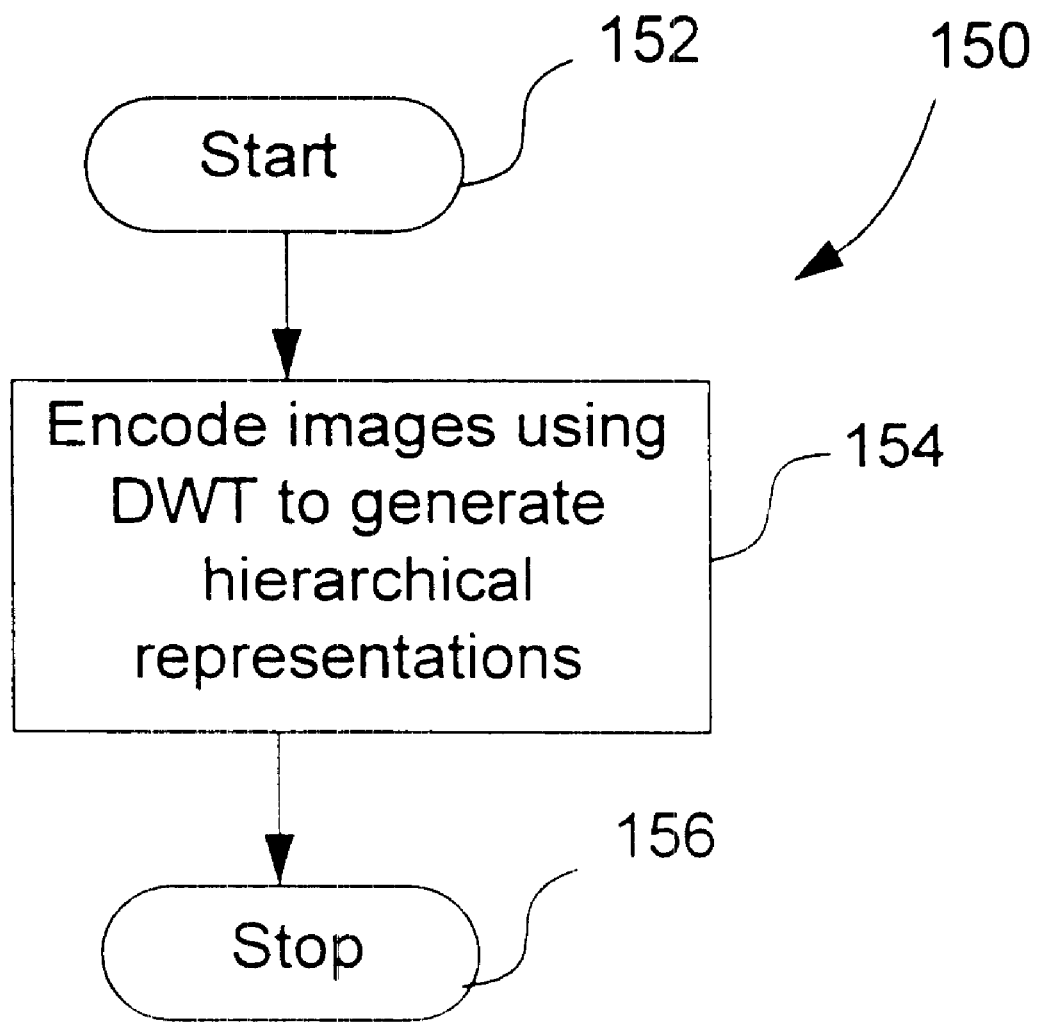
FIG. 18 is a flow diagram illustrating the encoding of a thumbnail in accordance with another embodiment.

To reduce the memory requirements for potentially large numbers of thumbnails and to provide rapid scaling of thumbnails, the preferred embodiment as depicted in FIG. 18 provides a method 150 of encoding thumbnails, where images are compressed and the form of compression enables rapid scaling of the thumbnail using a hierarchical representation. Preferably, in step 154, one or more thumbnails are generated by compressing respective images using a hierarchical discrete wavelet transform (DWT) compression technique. More preferably, the hierarchical DWT compression technique employed is the SWEET technique.

Figure 19:
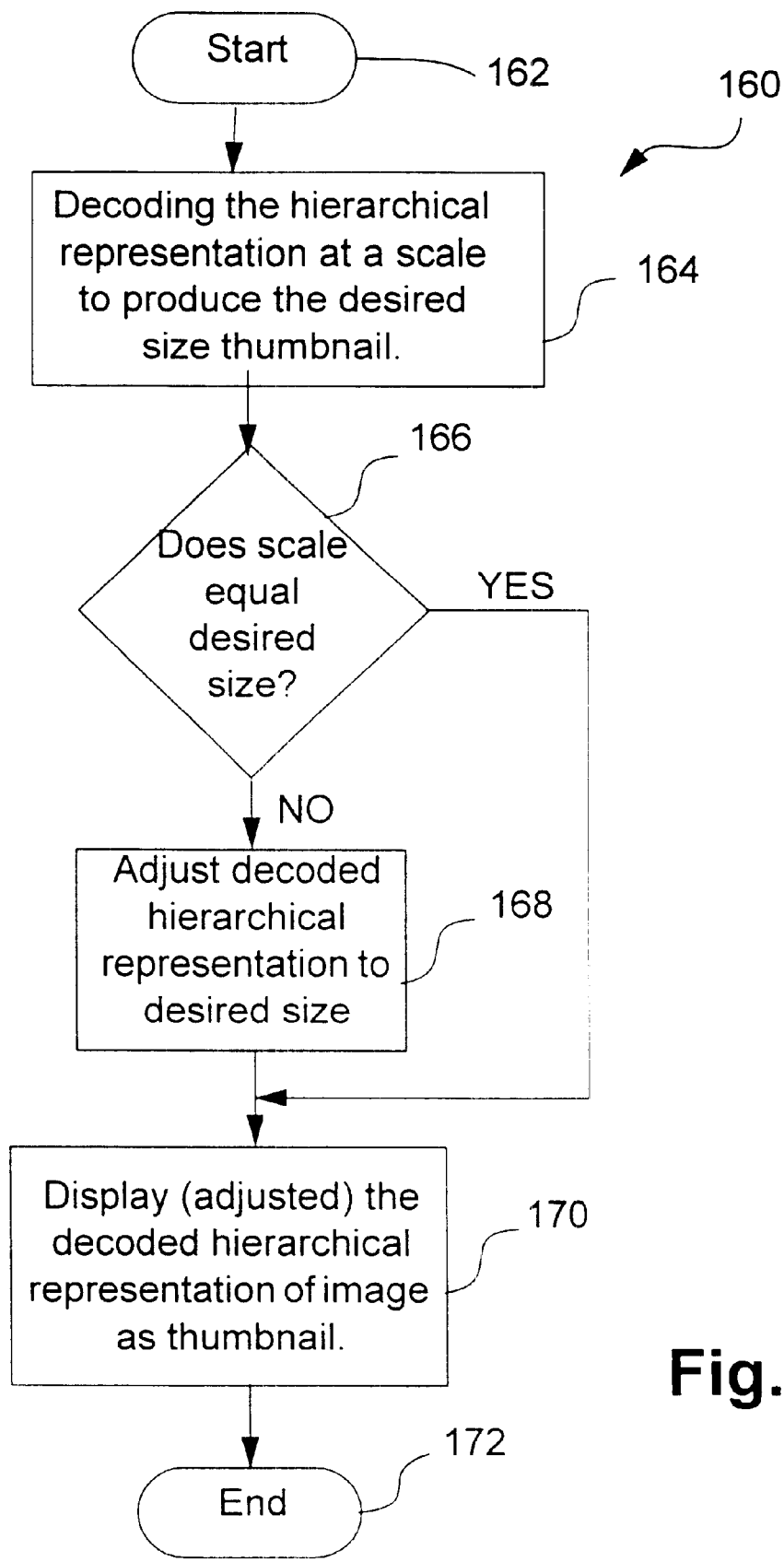
FIG. 19 is a flow diagram illustrating scaling of a thumbnail in accordance with another embodiment.

FIG. 19 is a flow diagram illustrating the process of scaling a thumbnail in accordance with the preferred embodiment. In particular, the flow diagram illustrates the process 160 of decoding thumbnails, where each thumbnail comprises a hierarchical representation of a digital image, at a predetermined one of a plurality of scales to provide the thumbnail for display having a desired size. Processing commences in step 162. In step 164, a thumbnail comprising the hierarchical representation of an image is decoded for the purpose of producing a desired size or scale thumbnail. The thumbnail is decoded to the scale closest to the desired size of the thumbnail for display. The scale of the decoded hierarchical representation may be equal to the desired size of the thumbnail. If it is not, the decoded hierarchical representation is preferably larger than the desired size. Again, the hierarchical representation is preferably an image compressed using the SWEET compression technique. In decision block 166, a check is made to determine if the scale of the decoded thumbnail equals the desired size to be displayed. If decision block 166 returns true (yes), processing continues at step 170. Otherwise, if decision block 166 returns false (no), processing continues at step 168.

In step 168, the size of the decoded hierarchical representation is adjusted to the desired size of the thumbnail to be displayed. Preferably, the adjustment step involves uniformly scaling down or downsampling the decoded hierarchical representation to provide the desired-size thumbnail if the scale of the decoded hierarchical representation is greater than the desired size of the thumbnail. Scaling of the thumbnail is preferably always down, and by less than a factor of 2 in each linear dimension. In operating environments such as Microsoft (TM) Windows (TM), in-built Windows functions may be used to do this, giving the system the opportunity to optimise the operation as best it can.

In step 170, the decoded hierarchical representation is displayed as the thumbnail at the desired size. Coded and/or decoded hierarchical representations (eg, compressed and/or decompressed thumbnails) are preferably stored in a cache or memory of thumbnails for later rapid retrieval and display. Optionally, because the process of decompressing the hierarchical representation to the desired scale can involve decoding several intermediate scales or sizes of the hierarchical representation, the intermediate scales may also be stored in the cache or memory of thumbnails. For example, a decoded thumbnail displayed at a size of 64×64 pixels may subsequently be displayed at a size of 16×16 pixels. If so, an earlier decoded thumbnail of this size may be retrieved from the cache, where the smaller size thumbnail was obtained in the process of decoding the 64×64 pixel thumbnail. Processing terminates in step 172.

While steps 164 and 168 preferably involve downsampling to adjust a (larger size) decoded hierarchical representation to the desired size, other techniques of doing so may be employed without departing from the scope of the invention. For example, the method of FIG. 19 could alternatively involve decoding the hierarchical representation to a scale smaller than the desired thumbnail size and upsampling the decoded hierarchical representation to provide the desired-size thumbnail. As a further alternative, the method may involve decoding the hierarchical representation in step 164 at two different adjacent scales or sizes (eg, 64×64 pixels and 32×32 pixels) to provide the desired size thumbnail. In step 168, interpolation can be carried out between the decoded hierarchical representations to provide the desired-size thumbnail. In this case, one of the scales of the decoded hierarchical representation is greater than the desired thumbnail size and the other scale is less than the desired thumbnail size.

Returning to FIG. 15 is a further exemplary screenshot illustrating the zoomed up display of thumbnails or image icons of the People group of FIG. 14. The scaled up versions of the thumbnails shown in FIG. 15 may be obtained in accordance with the process of FIG. 19.

Preferably, the process described above is implemented with the thumbnail encoding and scaling process embodied as software or a computer program (eg, within a browser application) recorded on a computer readable medium and loaded into the computer system 900 from the computer readable medium. Examples of such computer readable medium include a floppy disk, magnetic tape, a hard disc drive, a ROM or integrated circuit, a magneto-optical disk, a radio or infra-red transmission channel between the computer and another device, a computer readable card such as a PCMCIA card, a network connection to another computer or networked device, and the Internet and Intranets including e-mail transmissions and information recorded on websites and the like. The foregoing are merely exemplary of relevant computer readable media. Other computer readable media may be practiced without departing from the scope and spirit of the invention.

The method according to the preferred embodiment, and in particular using the SWEET compression technique, satisfies a number of concurrent requirements for storing and scaling thumbnails and therefore has a number of advantages. Firstly, the compression of the thumbnails allows as many thumbnails as possible to be stored in memory. This is particularly important where large numbers of thumbnails may be loaded into memory in an application where a user is for example browsing a large database of images. More preferably, a cache may be used to store thumbnails for rapid access, including multiple, different-sized decoded versions of thumbnails. Secondly, the preferred embodiment makes it possible to decompress thumbnails quickly. This provides rapid response time for users, especially in applications involving navigation of a database, such as an image database, where a user may zoom a thumbnail up or down. The method according to the preferred embodiment provides compression efficiency and decompression speed. Thirdly, the preferred embodiment provides satisfactory image quality at all sizes or scales at which thumbnails may be displayed. This third requirement is achieved in the preferred embodiment without requiring multiple compressions of the thumbnails stored at varying sizes as might be required by JPEG compression, or having a single compression of an image at the largest possible size needed and then scaling down uniformly. Thus, the preferred embodiment does not wastefully use up more storage and memory, and is not slow.

Compressing an image to produce a hierarchical representation using the SWEET compression technique has a number of advantages. The compression achieved by SWEET is typically 10:1 and therefore provides a good compression factor. Further, decompression using SWEET is fast and linear in relation to the number of pixels decompressed. Thus, the decompression time for displaying a large number (eg, a screen full) of small thumbnails is of the same order as displaying a few large size thumbnails. Further, SWEET hierarchically encodes thumbnails, and therefore it is not necessary to decompress the whole data set to get at the smaller size thumbnails. In fact, because the SWEET compression technique sequentially codes data, the first portion of SWEET compressed data contains all the information for decompressing the smallest size image, the next portion contains additional information required for decompressing the next larger size, and so on. Still further, performance is further enhanced because in the case of displaying a number of the smallest size thumbnails, all the data can be prefetched by the CPU cache.

With regard to step 168 of FIG. 19, full use of the highest available resolution stored by SWEET is made. In particular, SWEET provides a "minus 1" decompression, which provides a thumbnail which is twice the size (in each linear dimension) of the uncompressed thumbnail. When the minus 1 image is scaled down, satisfactory image quality is still provided. If a thumbnail is desired for viewing at a size that is larger than the maximum size provided by SWEET (which is a tunable parameter), the "minus 1" version can be scaled up. A further advantage of the preferred embodiment is that system can handle thumbnails whose uncompressed forms have different sizes.

As will be understood from the foregoing the, method according to the preferred embodiments permits thumbnails or images to be displayed in various different arrangements that require, at least, one or more of the following: one or more different images; or one or more images at different uniform scales; or one or more images in different positions. The method also facilitates changing between different display arrangements quickly. Images can be displayed with satisfactory quality regardless of the size.

Figure 20:
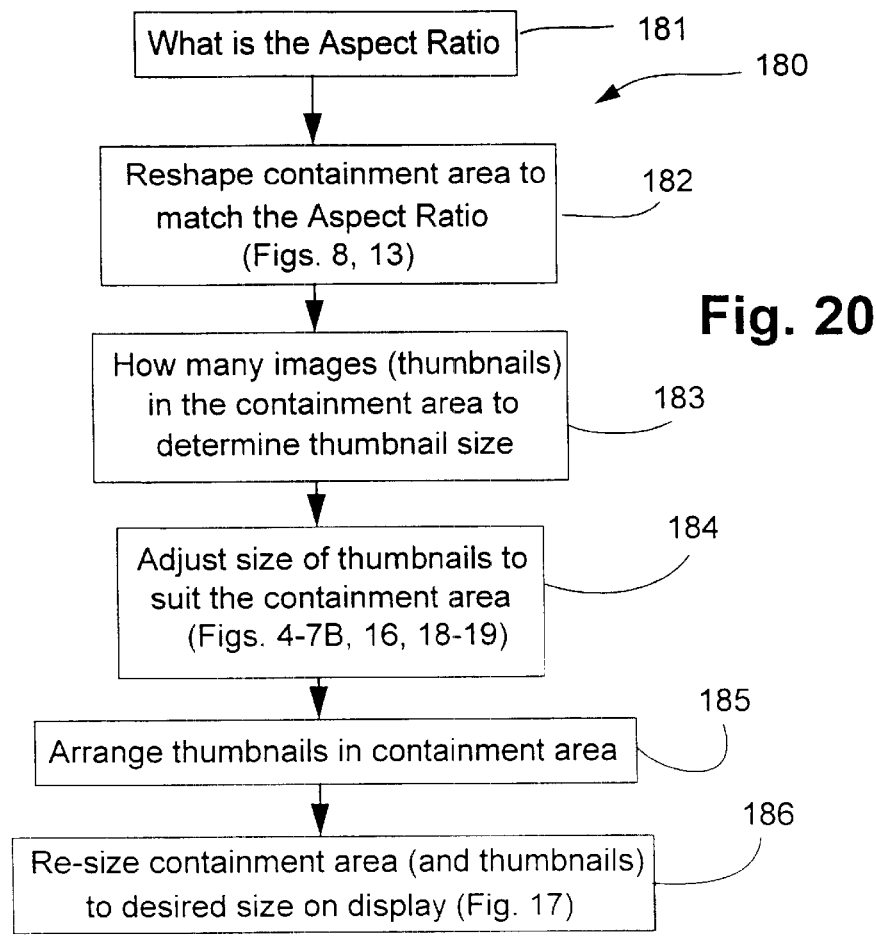
FIGS. 20 and 21 depict the use in combination of the embodiments of FIGS. 1 to 9 and 13 to 19.

FIG. 20 illustrates in flowchart form how the various embodiments described above may be practically implemented in the computer system 900. At step 181 the aspect ratio of the display 904 is identified from predetermined hardware parameters. At step 182, the containment area within the browser application software is adjusted in shape to have a corresponding aspect ratio as described with reference to FIGS. 8 and 13. At step 183 the number of thumbnails are identified so as to permit determination of the thumbnail size within the containment area. At step 184 the thumbnail size is adjusted according to FIGS. 4–7B, 16 or 18–19 so that all thumbnails fit within the containment area. At step 185, the re-sized thumbnails are arranged in the containment area and finally at step 156 the user may re-size the containment area to facilitate ease of browsing.

Figure 21:
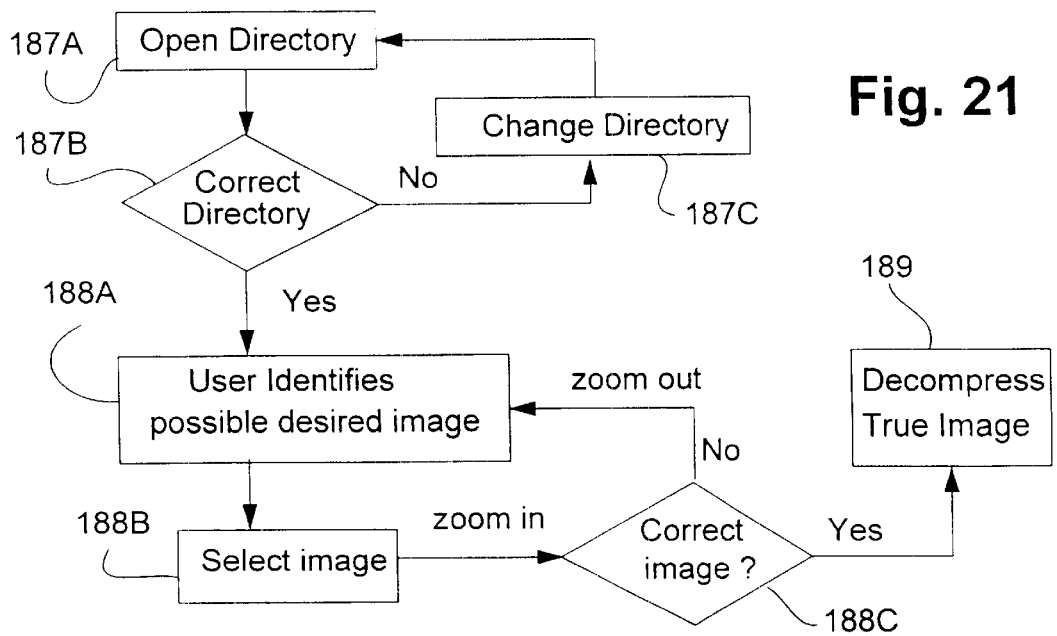

FIG. 21 shows how the above appears at a user level. Steps 187A–187C each identify directory movements that may be instigated by the user in a conventional manner. When the correct directory is identified at step 187B, at step 188A the user views the directory to identify a target image. Such an image is selected at step 188B which causes a fast zoom-in as described above. The user at step 188C views an intermediate sized image to confirm the correct image. If not, a zoom-out is performed and another selection made at step 188A. If the correct image is identified at step 188C, that may be selected to cause the true image to be decompressed and displayed at a high quality level. In each of the directory operations 187A–187C, the aspect ratio based manipulation of directories and containment areas may be performed, which in the preferred embodiment is combined with hierarchical representation of the image and its zooming.

SWEET—A Method For Digital Image Compression

This disclosure relates to a method and apparatus for representing digital image data, and in particular to a method and apparatus for encoding and decoding transform coefficients obtained from digital image data.

A number of transform-based image coding techniques are known which involve linear transforming a source image to decorrelate data and then encoding the transform coefficients. Such conventional techniques include the JPEG standard image compression method, which employs an 8×8 block discrete cosine transform (DCT). JPEG encoding involves transforming blocks of a source image using the DCT, quantising the resultant transform coefficients where most of the compression is effected taking advantage of visual perception, and lossless encoding the quantised coefficients in a predefined zig-zag sequence from lowest frequency coefficients to highest frequency coefficients.

There is also a compression technique termed the embedded zerotree wavelet (EZW) method. EZW involves applying a discrete wavelet transform to a source image to decompose the image into a number of high frequency subbands and a lowest frequency subband, normally at a number of different resolution levels or scales. Zero tree encoding is then applied to the subbands dependent upon predictions of the self-similarity of coefficients across scales. The zero-tree-encoded coefficients are then lossless encoded using arithmetic coding.

However, both techniques utilise complex methods for encoding position information and employ lossless encoding. Thus, the foregoing methods have a number of disadvantages including lack of flexibility and complexity in the coding technique.

In essence, the SWEET process of the present disclosure provides a method of representing a digital image to provide a coded representation, the method comprising the steps of:

transforming the digital image to derive a plurality of coefficients, each coefficient represented by a predefined bit sequence;

selecting a portion of the plurality of coefficients as a region; and (a) scanning the significance of each bitplane of the selected region from a most significant bitplane towards a least significant bitplane and providing a first token in the coded representation for each insignificant bitplane until a significant bitplane is determined, wherein a second token is provided in the coded representation for the significant bitplane;

(b) partitioning the selected region into two or more subregions having a predetermined form, and setting each of the subregions as the selected region; and (c) repeating steps (a) and (b) commencing from the significant bitplane until the selected region has a predetermined size, wherein the coefficients of the selected region are coded and provided in the coded representation.

Preferably, the linear transforming step comprises applying a discrete wavelet transform to the digital image, and the selected portion of the coefficients initially comprises the entire plurality of coefficients, or a subband of the coefficients.

Preferably, the first and second tokens comprise bit values of 0 and 1, respectively.

Preferably, the subregions are equally sized, and optionally are square.

Preferably, the predetermined size of the subregion is a 1×1 coefficient. Still further, the 1×1 coefficient is encoded by outputting bits of the corresponding bit sequence beginning with the respective significant bitplane. Preferably, only bits of the corresponding bit sequence above a predetermined minimum bit level are output in the coded representation.

Preferably, in step (c), steps (a) and (b) are repeated otherwise until each bitplane of the selected region has been scanned. Each bitplane of the selected region above a minimum bit level is scanned.

SWEET also provides a method of encoding a digital image, the method comprising the steps of:

decomposing the image using a discrete wavelet transform to provide a number of subbands;

for each subband, selecting the subband as an initial region and performing the following sub-steps:

(a) checking if a current bit level of the selected region is significant;

(b) if the current bit level is significant, outputting a first token in a coded representation and partitioning the selected region into a number of equally sized sub-regions, wherein each sub-region is processed as the selected region in turn;

(c) if the current bit level is insignificant, outputting a second token in the coded representation and selecting the next lower bit level of the selected region as the current bit level;

(d) repeating steps (a) to (c) until the current bit level is less than a specified minimum bit level, or the selected region has a predetermined size and coefficients of the selected region are coded in the coded representation.

Preferably, the coefficients of the selected region are coded by representing each coefficient by the bits between the corresponding current bit level and the minimum bit level.

SWEET also provides a method of encoding a digital image, the method comprising the steps of:

a) dividing the digital image into a plurality of blocks;

b) applying a subband transform to each of the blocks to provide a plurality of AC subband regions, at one or more resolutions, and a DC subband region for each block;

c) selection the DC subband region as a selected region and performing the following sub-steps:

ca) checking if a current bitplane of the selected region is significant;

cb) if the current bitplane is significant, outputting a first token in a coded representation and partitioning the selected region into a number of sub-regions, wherein each sub-region is processed as the selected region in turn;

cc) if the current bitplane is insignificant, outputting a second token in the coded representation and selecting the next lower bitplane of the selected region as the current bitplane;

cd) repeating sub-steps ca) to cc) until the current bitplane is less than a specified minimum bitplane, or the selected region has a predetermined size and coefficients of the selected region are coded in the coded representation;

d) selecting substantially all uncoded AC subband regions as a remaining region of each block and scanning the significance of each bitplane of the remaining region from a most significant bitplane towards a least significant bitplane, and outputting the second token for each insignificant bitplane until a significant bitplane is determined;

e) setting one or more AC subband regions, of a current resolution level, as a selected region and performing the sub-steps ca) to cd);

f) repeating step e) until substantially all AC subbands of the current resolution level have been encoded; and g) repeating steps d) to f) until all AC subbands of each block have been encoded.

Other aspects of SWEET include a method for decoding the coded representation of a digital image, an apparatus for representing a digital image to provide the coded representation, an apparatus for decoding the coded representation of a digital image, a computer software system for representing a digital image to provide the coded representation, and a computer software system for decoding the coded representation, in which the coded representation is produced in accordance with the first or second aspect of the invention.

Figure 22:
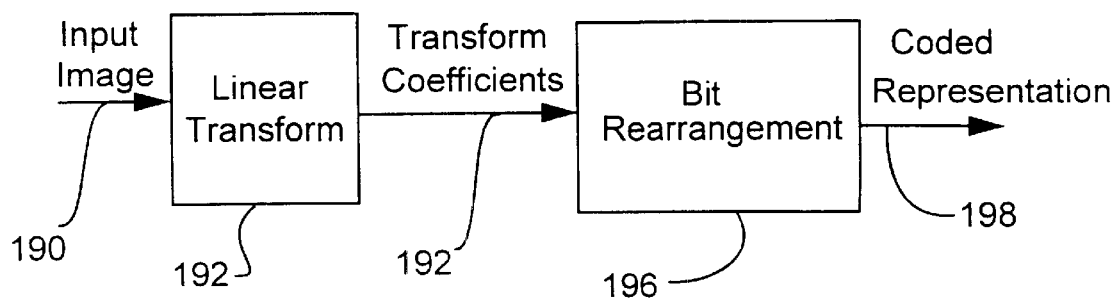
FIG. 22 is a high-level block diagram illustrating the image representation technique according to the SWEET processes.

A high-level block diagram is illustrated in FIG. 22 to provide an overview of the embodiments of the SWEET methods. An input image 190 is provided to the transform block 192, which is preferably a linear transform, to produce corresponding transform coefficients 194. A discrete wavelet transform (DWT) is preferably employed.

The two-dimensional DWT of an image is a transform that represents the image using a low frequency approximation to the image and three high frequency detail components. Conventionally, these components are termed sub-bands. Each of the four sub-images formed by the DWT is one quarter of the size of the original image. The low frequency image contains most of the information about the original image. This information, or energy compaction, is the feature of the discrete wavelet transform image subbands that is exploited for image compression.

The single-level DWT can be applied recursively to the low frequency image, or subband, an arbitrary number of times. For example, a three-level DWT of the image is obtained by applying the transform once and then applying the DWT to the low subband resulting from the transformation. Thus, this results in 9 detailed subbands and one (very) low frequency subband. Even after three levels of DWTs, the resulting low frequency subband still contains a significant amount of information of the original image, yet is 64 times smaller (¼×¼×¼), thereby effecting a factor of 64 in compression.

However, other linear transformations for decorrelating image data may be practiced without departing from the scope of the invention. For example, a discrete cosine transform (DCT) can be practiced. The transform coefficients 194, or more specifically the bit sequences representing their values, are then coded by the bit rearrangement block 196 in an efficient fashion to provide the coded representation 198.

The decoding process is simply the reverse of this encoding process. The encoded coefficients are decoded into the transform coefficients. The (transform domain) image is then inverse transformed to form the original image, or some approximation thereof.

SWEET is preferably be practiced using a conventional general-purpose computer, such as that shown in FIGS. 1, 2 and 3, wherein the processes of FIGS. 24 to 27 or FIGS. 29 to 32 are implemented as software executing on the computer. In particular, the steps of the coding and/or decoding methods are effected by instructions in the software that are carried out by the computer system 900.

Before proceeding with a further description of the SWEET implementation, a brief review of terminology used hereinafter is provided. For a binary integer representation of a number, "bit n" or "bit number n" refers to the binary digit n places to the left of the least significant bit. For example, assuming an 8-bit binary representation, the decimal number 9 is represented as 00001001. In this number, bit 3 is equal to 1, while bits 2, 1, and 0 are equal to 0, 0, and 1, respectively.

For transform coding applications, the number of bits per coefficient required to represent the possible range of coefficients is determined by the linear transform and the resolution of each pixel (in bits per pixel) in the input image. This range of values for each pixel is typically large relative to the values of most of the transform coefficients, and thus many coefficients have a large number of leading zeros. For example, the number 9 has four leading zeros in a 8-bit representation and has 12 leading zeros for a 16-bit representation. The embodiment of the invention provides a method and apparatus for representing (or coding) these leading zeros, for blocks of coefficients, in an efficient manner. The remaining bits and sign of the number are encoded directly without modification.

To simplify the description and not to obscure unnecessarily the invention, the transform coefficients are assumed hereinafter to be represented in an unsigned binary integer form, with a single sign bit. That is, the decimal numbers −9 and 9 are represented with the same bit sequence, namely 1001, with the former having a sign bit equal to 1 to indicate a negative value, and the latter having a sign bit equal to 0 to indicate a positive value. The number of leading zeros is determined by the range of the transform coefficients. In using an integer representation, the coefficients are implicitly already quantised to the nearest integer value, although this is not necessary for this embodiment of the invention. Further, for the purpose of compression, any information contained in fractional bits is normally ignored.

A region consists of a set of contiguous image coefficients. The term coefficient is used hereinafter interchangeably with pixel, however, as will be well understood by a person skilled in the art, the former is typically used to refer to pixels in a transform domain (eg., a DWT domain).

Encoding Process of SWEET

Figure 24:
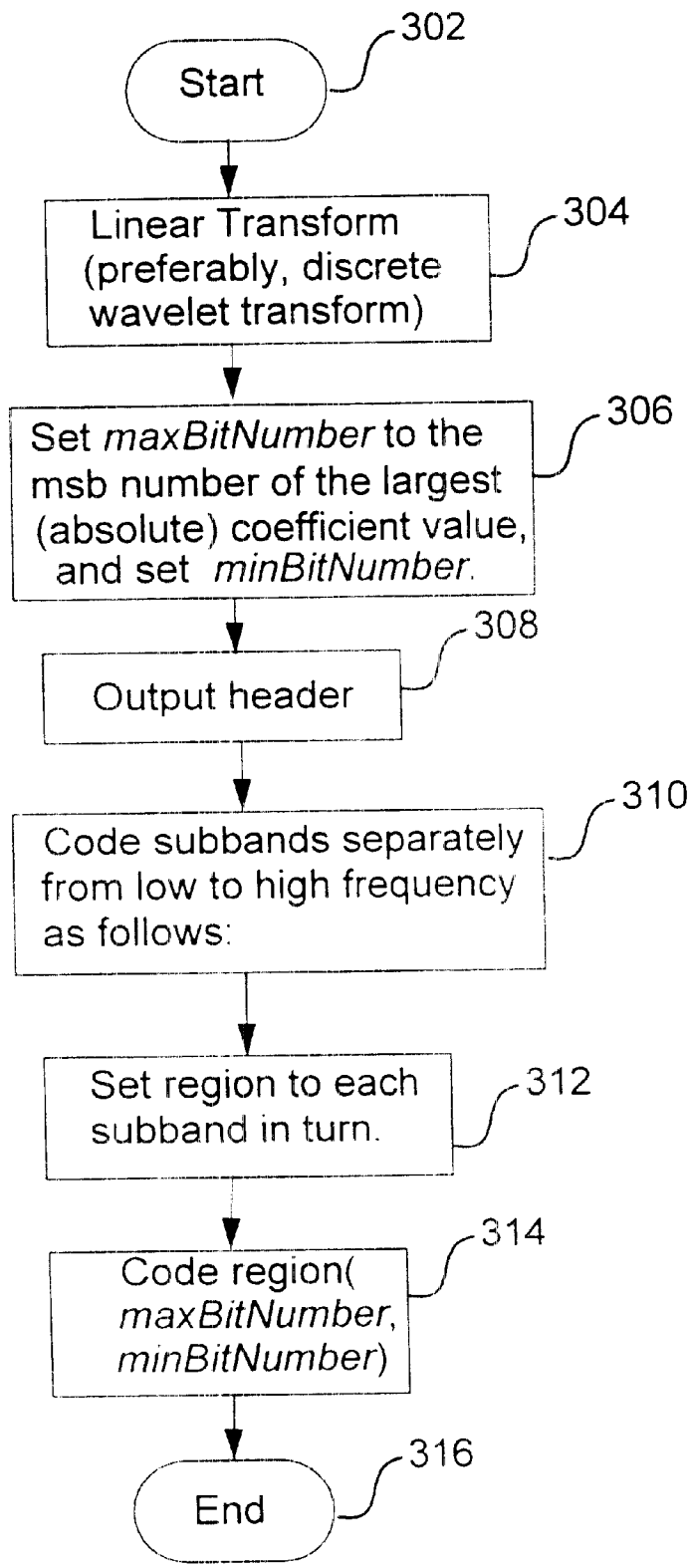
FIG. 24 is a flow diagram illustrating the method of representing, or encoding, an image according to a SWEET process.

FIG. 24 is a flow diagram illustrating the image encoding method according to the preferred embodiment. In step 302, processing commences using an input image. In step 304, the input image is transformed using a linear transformation, preferably a discrete wavelet transform. An initial region is defined to be the whole image. For example, in the case of a three-level DWT of the input image, the resulting coefficients consisting of the 10 subbands can be specified as the region. Alternatively each subband can be processed separately, setting each initial region to the whole subband in question.

In step 306, the most significant bit (msb) of the largest absolute value of the transform coefficients is determined and a parameter, maxBitNumber, is set to this coefficient value. For example, if the largest transform coefficient has a binary value of 00001001 (decimal 9), the parameter maxBitNumber is set to 3, since the msb is bit number 3. Alternatively, the parameter maxBitNumber may be set to be any value that is larger that the msb of the largest absolute value of the transform coefficients.

Further, in step 306, a coding parameter, minBitNumber is set to specify the coded image quality. In particular, this coding parameter specifies the precision of every coefficient in the transformed image and can be varied as required. For example, a minBitNumber of 3 provides a coarser reproduction of the original image than does a value of 1.

Optionally, the technique involves step 308 which provides an output header in the coded representation of the input image. Thus, in a practical implementation, header information is output as part of the coded representation. For example, the output header of the embodiment of the invention may contain information about the source image, including the image height and width, the number of levels of the DWT, the mean value of the DC subband, the maxBitNumber parameter, and the minBitNumber parameter.

Beginning in step 310, each subband of the transformed image is coded separately in steps 312 and 314. Each subband is coded independently, in order from low frequency to high frequency. For the DC subband, the mean value is removed prior to coding and coded into the header information in step 308. In step 312, each subband is coded by setting an initial region as the whole subband. In step 314, the region is encoded with the maxBitNumber and minBit-Number as parameters. This provides a hierarchical code, since lower resolution versions of the image are coded into the bit stream before higher resolutions. Processing terminates in step 316.

Figure 25:
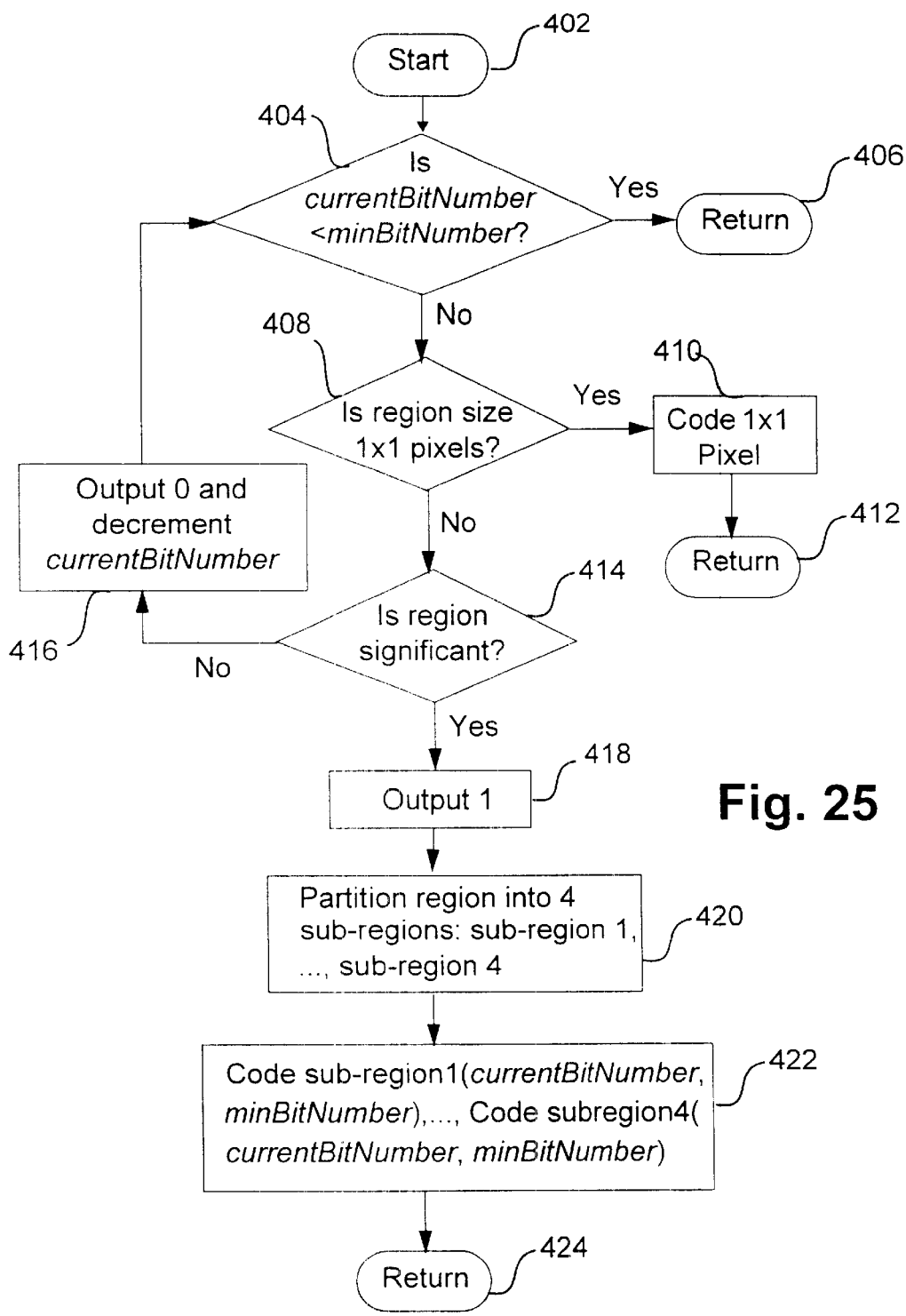
FIG. 25 is a detailed flow diagram illustrating the step of coding a region in FIG. 24.

FIG. 25 is a detailed flow diagram of the procedure "Code region(currentBitNumber, minBitNumber)" called in step 314 of FIG. 24 for coding each region, where maxBitNumber is provided as the currentBitNumber. In step 402, processing commences. The inputs to the region coding process of FIG. 25 include the currentBitNumber and minBitNumber parameters. Preferably, the method is implemented as a recursive technique where the process is able to call itself with a selected region or sub-region. However, the process may implemented in a non-recursive manner without departing from the scope and spirit of the invention.

In decision block 404, a check is made to determine if the currentBitNumber parameter is less than the minBitNumber parameter. Otherwise, if decision block 404 returns true (yes), nothing is done and processing returns to the calling procedure in step 406. This condition indicates that every coefficient in the selected region has a msb number less than minBitNumber. If decision block 404 returns false (no), processing continues at decision block 408.

In decision block 408, a check is made to determine if the selected region is a 1×1 pixel. If decision block 408 returns true (yes), processing continues at step 410. In step 410, the 1×1 pixel is coded. Preferably, this involves directly outputting the remaining bits above the minBitNumber in the coded representation. In step 412, processing returns to the calling procedure. Otherwise, if decision block 408 returns false (no), the region consists of more than one coefficient and processing continues at decision block 414.

In decision block 414, the selected region is checked to determine if it is significant. That is, the significance of the region is tested. The region is said to be insignificant if the msb number of each coefficient in the region is less than the value of the currentBitNumber parameter. To make the concept of region significance precise, a mathematical definition is given in Equation (1). At a given bit number, say currentBitNumber=n, the region is said to be insignificant if:

$$|c_{ij}|<2^n, \forall i,j \in R, \qquad (1)$$

where R denotes the region, and $c_{ij}$ denotes coefficient (i,j) in this region.

If decision block 414 returns false (no), processing continues at step 416. In step 416, a value of 0 (or first token) is output in the coded representation stream, and the currentBitNumber parameter is decremented by 1. That is, the next, lower bitplane of the region is selected for processing. Processing then continues at decision block 404, where the region is again processed with the parameters currentBitNumber-1 and minBitNumber. Otherwise, if decision block 414 returns true (yes), that is, the region is significant, processing continues at step 418.

In step 418, a value of 1 (or second token) is output in the coded representation stream. In step 420, the selected region is partitioned into a predetermined number (preferably, 4) of subregions using a specified partitioning algorithm. The partitioning algorithm used is known to the decoder.

Figure 23:
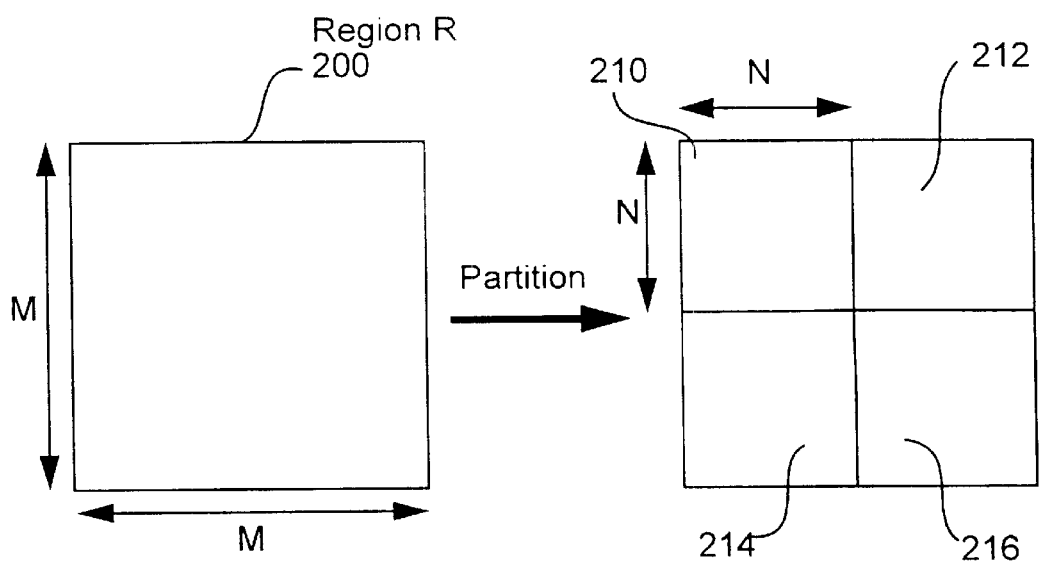
FIG. 23 is a diagram illustrating partitioning according to a SWEET process.

In this embodiment of the invention, square regions are used. A region is partitioned preferably into 4 equal-sized (square) subregions. As shown in FIG. 23, the selected region (R) 200 has a size of M×M coefficients and is partitioned into four equal-sized subregions 210, 212, 214 and 216. Each of the subregions has a size of N×N, where N is equal to M/2. This is not always possible depending on the size and shape of the initial region. If this is not possible, the initial region can be partitioned into a number of square regions, each having dimensions that are a power of 2, and encode these partitions separately. In any case, this initialisation has minimal effect on the overall results if done in an intelligent fashion. In an alternate embodiment, a different partition may be used that is suitable for a block-based coder.

In step 422, each subregion is then coded with the same currentBitNumber and minBitNumber parameters. This is preferably done by means of a recursive call to the procedure "Code region(currentBitNumber, minBitNumber)" of FIG. 25. This coding of subregions may be implemented in parallel or sequentially. In the latter case, the processing may commence from a low frequency subband to higher frequency subbands in turn.

In the coded representation, a transform coefficient is coded by simply outputting the pixel bits from the currentBitNumber to the minBitNumber. Preferably, a convention is followed whereby the sign is output only if some of the coefficient bits were non-zero. For example, if currentBitNumber=3, minBitNumber=1, then −9 (00001001) is coded as "1 0 0" followed by a sign bit "1".

Decoding Process of Preferred Embodiment

Figure 26:
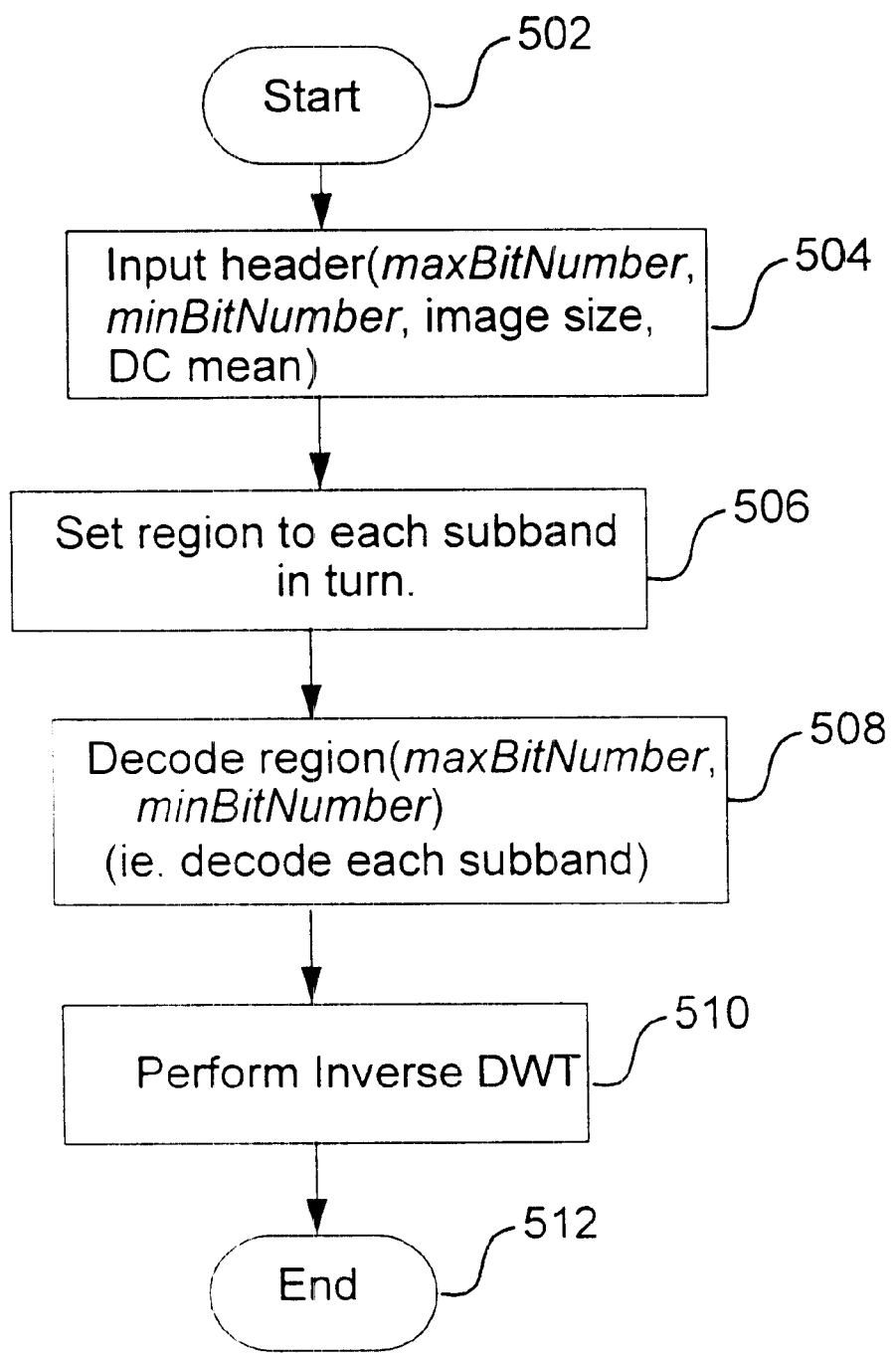
FIG. 26 is a flow diagram illustrating the method of decoding a coded representation of an image produced in accordance with the method FIG. 24.

FIG. 26 is a flow diagram illustrating a method of decoding the coded representation of an image obtained using the process of FIGS. 24 and 25. In step 502, processing commences using the coded representation. In step 504, the header information is read from the coded representation to determine the size of the original image, and hence the initial region size. Also, information such as maxBitNumber (equal to the initial currentBitNumber in the coding process) and minBitNumber are input. Further information includes the mean value of the DC subband.

In step 506, decoding of each subband is commenced by setting the region to the respective subbands in turn. In step 508, the selected region is decoded using the maxBitNumber and minBitNumber parameters. In step 510, the inverse DWT is applied to the decoded selected region. Processing terminates in step 512.

Figure 27:
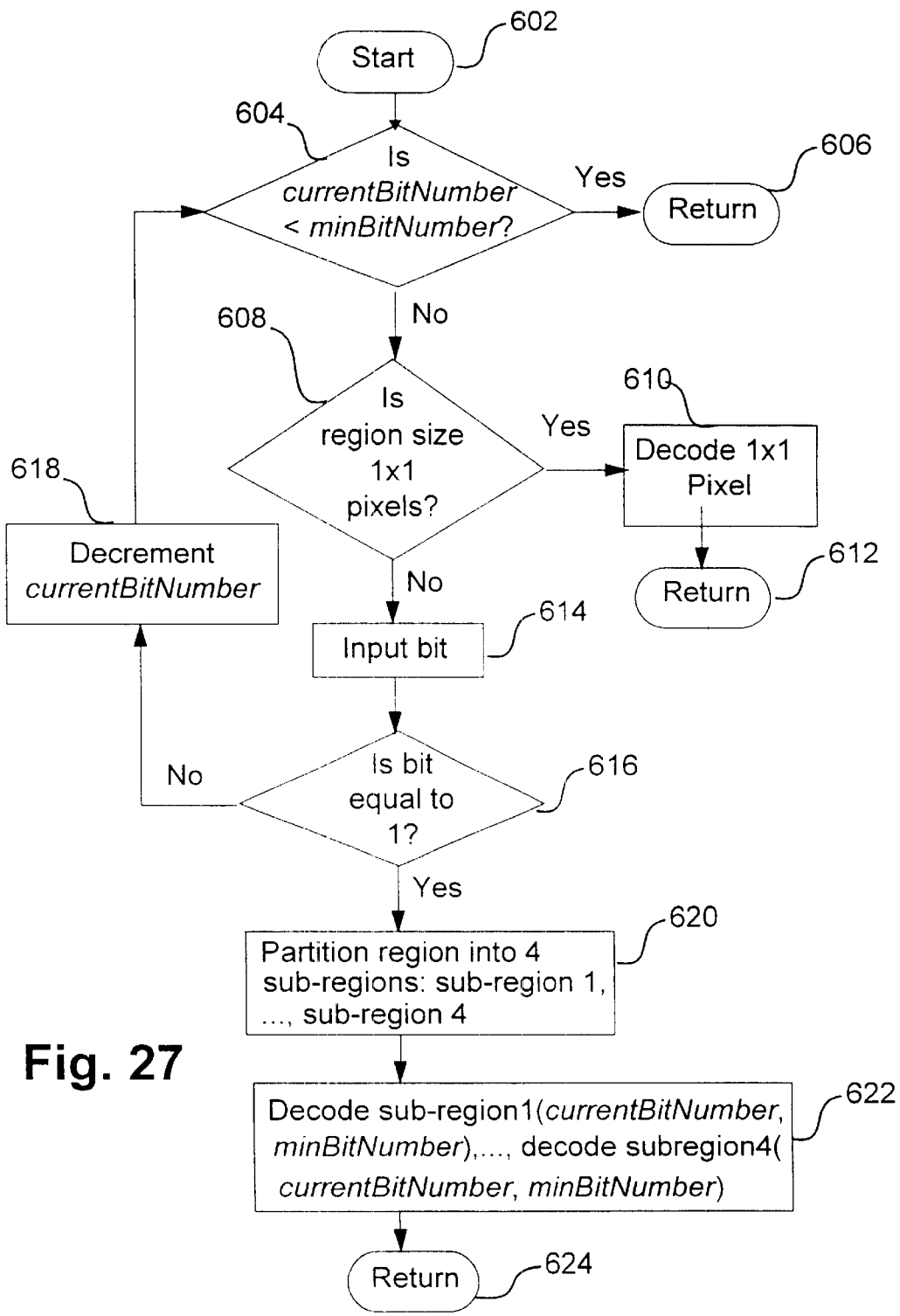
FIG. 27 is a detailed flow diagram illustrating the step of decoding a region in FIG. 26.

FIG. 27 is a detailed flow diagram of step 508 of FIG. 26 for decoding each region using procedure call "Decode region(currentBitNumber, minBitNumber)", where maxBitNumber is provided as the currentBitNumber. In step 602, processing commences. The inputs to the region decoding process of FIG. 27 are the currentBitNumber and minBitNumber parameters. Again, the method is preferably implemented as a recursive technique. However, the process may be implemented in a non-recursive manner without departing from the scope and spirit of the invention.

In decision block 604, a check is made to determine if the currentBitNumber is less than the minBitNumber. If decision block 604 returns true (yes), processing continues at step 606, where processing returns to the calling procedure. Otherwise, if decision block 604 returns false (no), processing continues at decision block 608.

In decision block 608, a check is made to determine if the selected region has a size of 1×1 pixels. If decision block 608 returns true (yes), processing continues at step 610. In step 610, the 1×1 region is decoded. Processing then returns to the calling procedure in step 612. If decision block 608 returns false (no), processing continues at step 614. In step 614, a bit is input from the coded representation.

In decision block 616, a check is made to determine if the bit is equal to 1, that is, the input is checked to determine if the region is significant. If decision block 616 returns false (no), processing continues at step 618. In step 618, the currentBitNumber is decremented, and processing continues at decision block 604. Otherwise, if decision block 616 returns true (yes), processing continues at step 620. In step 620, the region is partitioned into the predetermined number (preferably, 4) of sub-regions. In step 622, each of the sub-regions is decoded using the currentBitNumber and minBitNumber. In the preferred embodiment, this is carried out by means of a recursive call to the process illustrated in FIG. 27. In step 624, processing returns to the calling procedure.

Thus, the bits output from the significance decisions in the encoder instruct the decoder on which path of the algorithm to take, thus mimicking the encoder. The pixels, and possible sign, are decoded by simply reading in the appropriate number of bits (currentBitNumber to minBitNumber and if some of these are non-zero the sign bit).

Two-Dimensional Example

The method effectively codes the leading zeros of most transform coefficients, while coding the bits from the most significant bit to the predetermined least significant bit, specified by the parameter minBitNumber, and the sign simply as is. Thus, the preferred embodiment of the present invention advantageously represents the leading zeros. This method is very efficient in certain situations, namely for coding discrete wavelet transform image coefficients, which typically exhibit a large dynamic range. A few coefficients typically have very large values, while most have very small values.

Figures 28A, 28B, 28C, 28D:
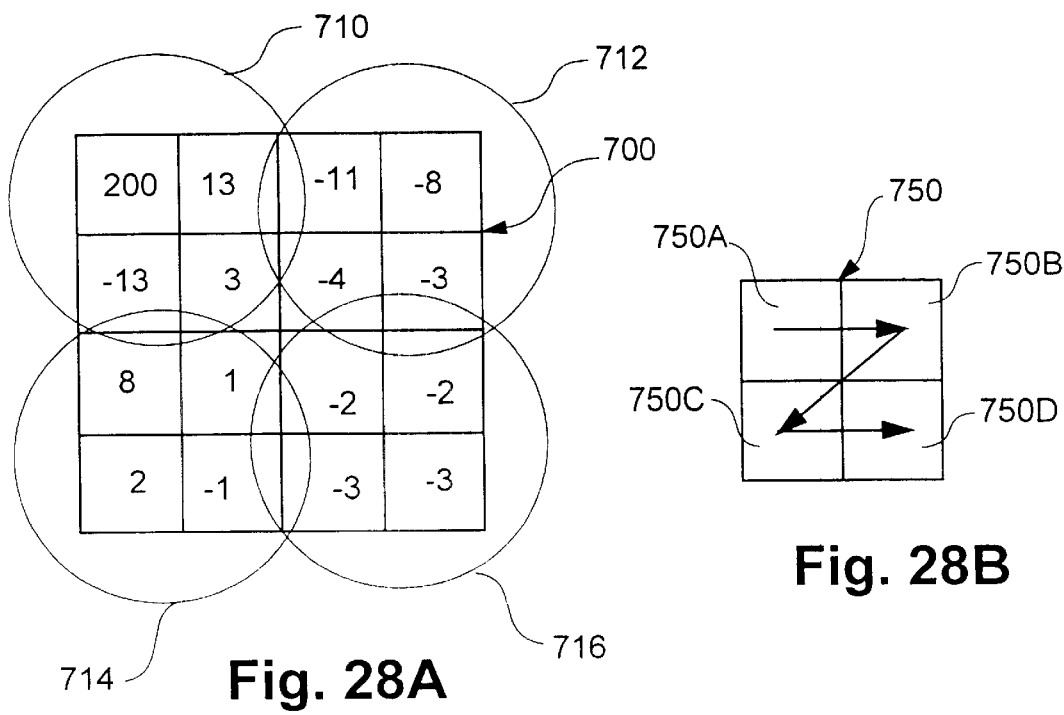
FIGS. 28A to 28D are diagrams illustrating the processing of a two-dimensional, eight-coefficient region in accordance with the encoding and decoding method of FIGS. 24 to 26.

An example of encoding a two-dimensional region comprising 4×4 coefficients is described with reference to FIGS. 28A to 28D. The processing of the 4×4 region 700 of FIG. 28A is commenced with the maxBitNumber set to 7 since this is the largest bit number (bitplane) of all of the coefficients:

$$\begin{bmatrix} 200 & 13 & -11 & -8 \\ -13 & 3 & -4 & -3 \\ 8 & 1 & -2 & -2 \\ 2 & -1 & -3 & -3 \end{bmatrix}$$

The minBitNumber is set to 3, for illustrative purposes. A header is preferably output in the coded representation containing the maxBitNumber and minBitNumber. The process of coding the region 700 then follows.

At currentBitNumber=7, a one (1) is output since the region 700 is significant with respect to bit number 7 (see decision block 404, 408, and 414 and step 418 of FIG. 25). The region 700 is then partitioned into four sub-regions (see step 420 of FIG. 25): the top left region 710, the top right region 712, the bottom left region 714 and the bottom right region 716 of FIG. 28A. Each of the subregions consist of 2×2 coefficients.

The sub-regions 710, 712, 714 and 716 of FIG. 28A are in turn coded in the predefined processing sequence shown of FIG. 28B, where a region 750 consists of four sub-regions 750A to 750D. The three arrows illustrated in the diagram indicate the order or sequence of processing, that is, top left sub-region 750A, top right sub-region 750B, bottom left sub-region 750C and bottom right sub-region 750D, respectively.

The sub-region 710 of FIG. 28A is coded first (see step 422 of FIG. 4). For the currentBitNumber equal to 7, a one (1) is output in the coded representation. The sub-region 710 is then partitioned into four 1×1 pixels having decimal values 200, 13, −13 and 3. Each of these coefficients is coded by outputting the bits of each coefficient from the currentBitNumber=7 to the minBitNumber=3 (see decision block 408 and step 410 of FIG. 28). A sign bit is then output if required. Thus, the decimal value is 200 is coded as 11001 followed by the sign bit 0. The coefficient value 13 is coded as 00001 with a sign bit 0. The coefficient value −13 is coded as 00001 with a sign bit 1. Finally, the coefficient value 3 is coded as 00000 (without a sign bit). The coded representation of each coefficient includes the two "1" bits preceding the bits of coefficients "200" between the currentBitNumber and minBitNumber. This completes the coding of the top left sub-region 710. The coded output at this state is:

$$\underbrace{11\underline{11001}}_{200} \quad \overset{\text{sign bit}}{0} \quad \underbrace{00001}_{13}\underbrace{00001}_{-13}\underbrace{00000}_{3}.$$

The header information is not shown in the foregoing expression.

The top right sub-region 712 is then coded (per FIG. 28B). A zero (0) is output for each of currentBitNumber equal to 7, 6, 5, and 4, since the region 712 is insignificant with respect to these bit numbers. A one (1) is output at currentBitNumber=3, since this bitplane is significant with respect to bit number 3. The sub-region 712 is partitioned into the four 1×1 pixels having values −11, −8, −4 and −3. These decimal values are coded as bit value 1 with sign bit 1, bit value 1 with sign bit 1 and bit values 0 and 0 without sign bits, respectively. Thus, at this stage, the coded representation is as follows:

$$1111001000001000001100000001\ \underset{-11}{11}\ \underset{-8}{11}\ \underset{-4}{0}\ \underset{-3}{0}$$

The bottom left sub-region 714 is then encoded. A zero (0) is output for each of currentBitNumber equal to 7, 6, 5, and 4, since the region 714 is insignificant with respect to these bit numbers. A one (1) is output at currentBitNumber equal to 3, since this bitplane is significant with respect to bit number 3. The sub-region 714 is then partitioned into four 1×1 pixels having values 8, 1, 2 and −1. These are coded respectively as binary value 1 with sign bit 0, and binary values 0,0 and 0 without sign bits.

Finally, the bottom right sub-region 716 having values −2, −2, −3, and −3 is coded. A zero (0) is output for each of currentBitNumber=7, 6, 5, 4 and 3 since the sub-region 716 is insignificant with respect to these bit numbers. No sign bits are output. Thus, the coded representation is as follows:

$$11110010000010000011000000001111100000011000000000.$$

The decoder simply mimics the encoding process to reconstruct the region from the coded representation as depicted in FIG. 28C.

The decoding process can be made "smarter" in a number of ways. One such a "smarter" way is depicted in FIG. 28D. In this case, the magnitude of the non-zero coefficients is each increased by half of 2 to the power of minBitNumber. This is depicted in FIG. 28D. In this manner, the "smart" decoding processing generally reduces the mean square error between the decoded and the original coefficients. Still further, the encoder can alternatively perform this (type of) operation, thereby leaving the decoder to use the simplest depicted in FIG. 28C.

Encoding Process of Alternate SWEET

A coding process according to an alternate SWEET method is hereinafter described with reference to FIGS. 29 to 32. The processes illustrated in the flow diagrams of FIGS. 29 to 32 may be implemented using software executing on a general-purpose computer 900 corresponding to that described.

A discrete wavelet transform of an entire digital image can be performed on a block-by-block basis. The result of the transformation upon each block is a set of coefficients, which are essentially equivalent to a set of spatially corresponding coefficients of a discrete wavelet transform of the entire image. For example, from a predetermined set of coefficients of a DWT for an entire image, a portion or block of the digital image can be reproduced to a specified detail. Selecting the predetermined set of coefficients from the frequency domain amounts substantially to representing the corresponding portion of a digital image (the block) from the spatial domain. A block based DWT of a digital image can be performed by decomposing an image into a plurality of blocks and applying the transform to each block independently, thereby substantially evaluating those DWT coefficients relevant to the current spatial location. The advantage of adopting a block-based transform approach is that a block can be subsequently encoded with minimal interaction (substantially independent) from another block of the image. Block-based techniques are inherently memory localised and therefore are generally efficient when implemented using computer systems.

Figure 29:
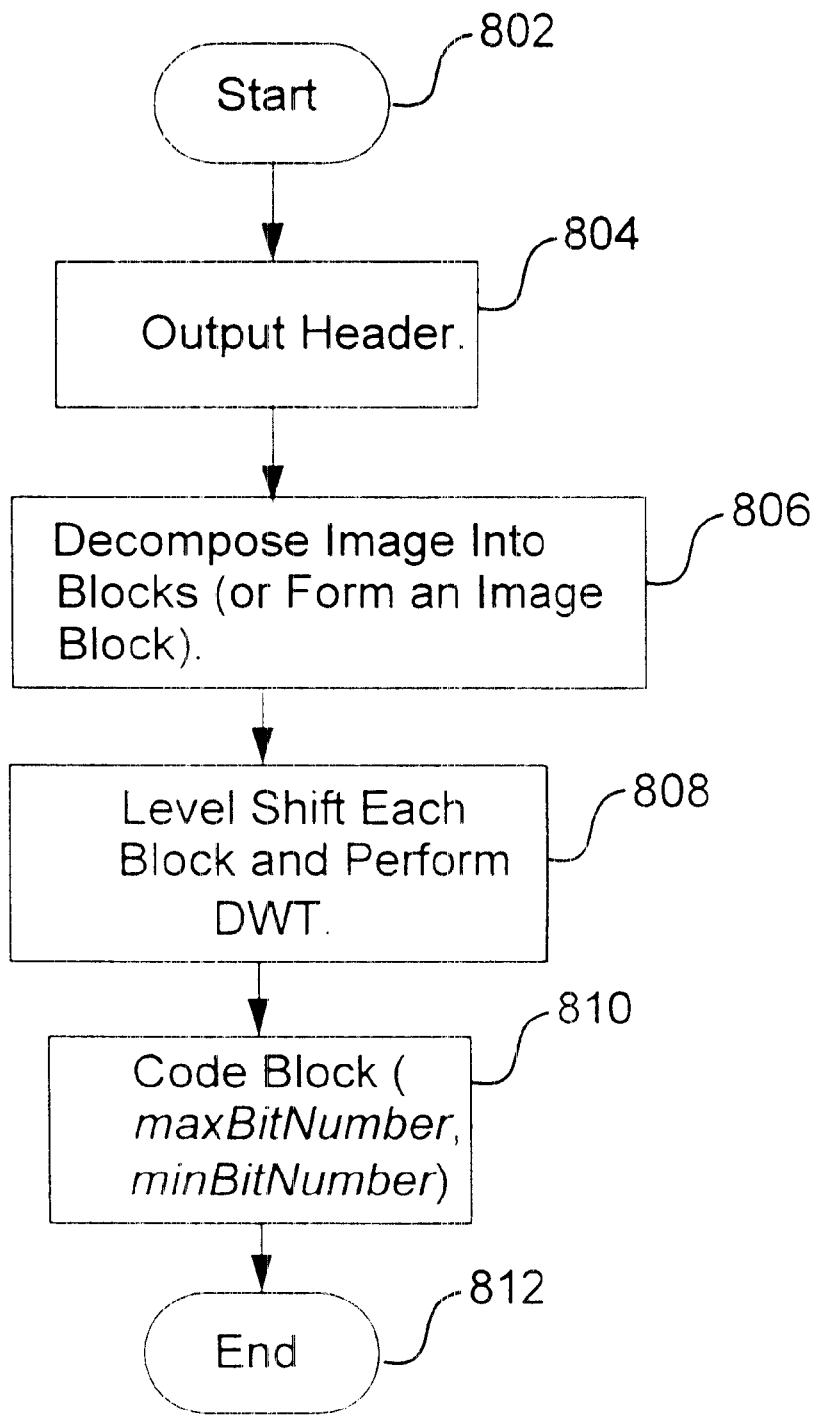
FIGS. 29 to 32 are flow diagrams illustrating the method representing, or encoding, an image according to an alternate SWEET method.

FIG. 29 is a flow diagram illustrating the block-based encoding process according to the alternate embodiment of the invention. Processing commences at step 902. In step 904, a header is output. This information preferably includes the image height and width, the block size, the number of levels of the DWT, and two coding parameters maxBitNumber and minBitNumber. Optionally, more or less header information may be used depending upon the application.

The coding parameter maxBitNumber can be selected in a variety of ways. If the block DWT is performed on all image blocks prior to coding of any of them, the maxBitNumber can be chosen to be the MSB number of the largest coefficient across all DWT blocks. For example, if the largest coefficient is 10000001 (decimal value 129), the maxBitNumber is set to 7 since the MSB is bit number 7. Alternatively, a deterministic bound can be used which is determined by the transform and the resolution of the input image. For example, with an 8-bit input image (level shifted to 7-bits plus sign) and the Haar transform, the largest MSB is bounded by J+7 where J is the number of levels of the DWT. If the blocks are small, the selection of this parameter can have a significant effect on compression. In some instances, more sophisticated ways of selecting maxBitNumber may be employed. However, this depends upon the specific application.

The parameter minBitNumber determines the compression ratio versus quality trade off and can be varied. For example, for nearly orthogonal transforms, a value of 3 provides adequate image quality for 8-bit, grey-scale or 24-bit, RGB images.

In step 906, the image is decomposed into blocks (or an image block is formed). The image is decomposed preferably into overlapping blocks. However, non-overlapping blocks may be employed. The block of coefficients can be as large as the whole original image, or as small as a block of 8×8 coefficients (for a three-level transform). For low memory applications, a block that is as small as possible may be employed. Generally, a block size of 16 coefficients is sufficient for higher levels of compression with a three or four level DWT. A block size of 8×8 coefficients with a three-level DWT can maintain good coding efficiency by employing differential pulse code modulation (DPCM) on the DC coefficient of each block.

In step 908, each block is level shifted and the transform is performed. Preferably, a DWT is employed. The image values are level shifted (for example, by 128 for an 8-bit image) to reduce or eliminate any undue mean bias, and each spatial block of the image is transformed. For a DWT, usually some knowledge of the block surrounding the current block is needed (and similarly for the inverse DWT), although this is not strictly required.

In step 910, the block is coded using the maxBitNumber and minBitNumber parameters. Processing terminates in step 912.

Figure 30:
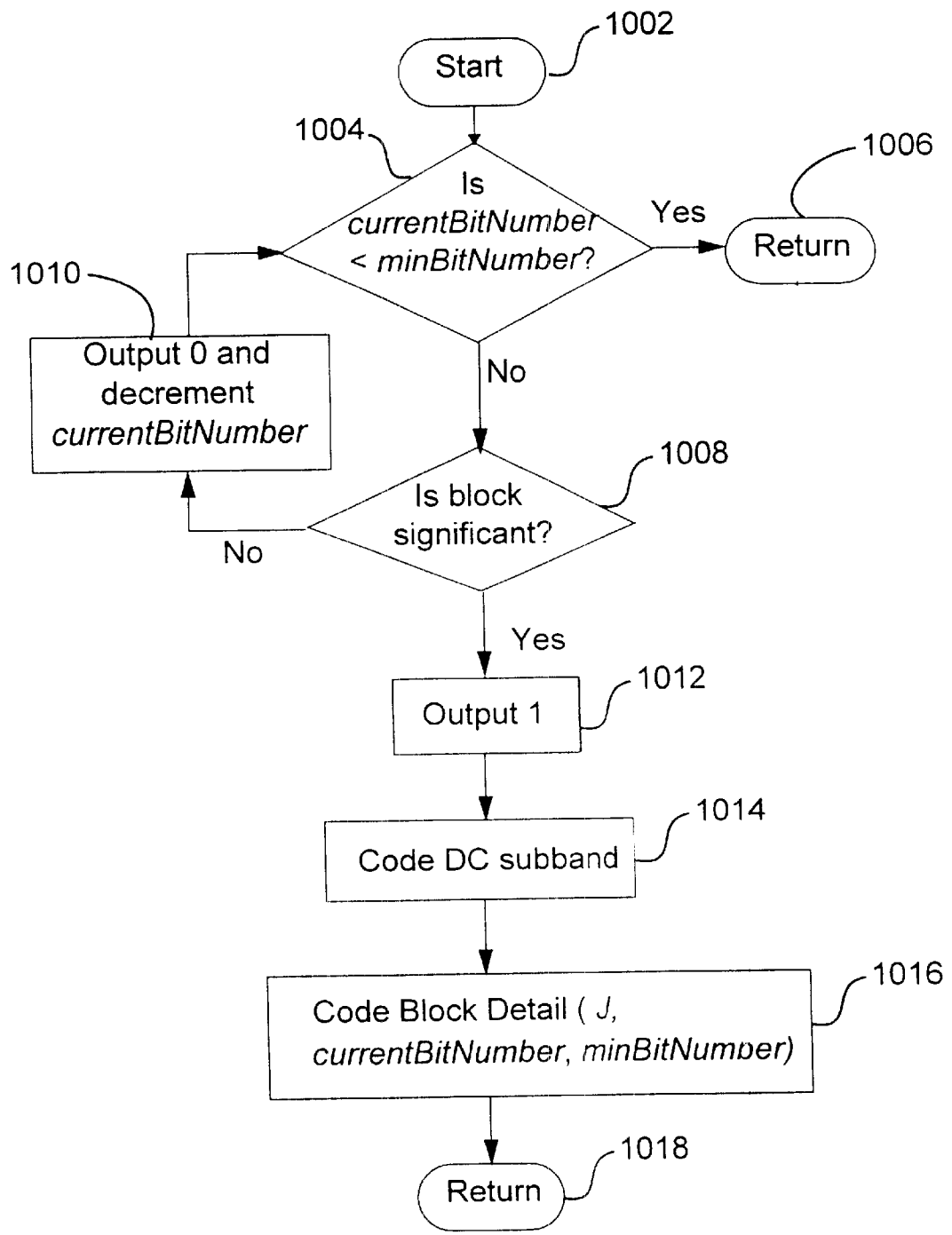

Step 910 for coding a block is illustrated in detail in the flow diagram of FIG. 30. Inputs to the block coding process of FIG. 30 include the currentBitNumber and the minBitNumber parameters. With reference to step 910 of FIG. 29, the maxBitNumber is input as the currentBitNumber parameter. Processing commences in step 1002. In decision block 1004, a check is made to determine if the currentBitNumber is less than the minBitNumber. If decision block 1004 returns true (yes), processing continues at step 1006. In step 1006, execution returns to the calling process, thereby indicating that every coefficient in the block has an MSB number less than the minBitNumber. Otherwise, if decision block 1004 returns false (no), processing continues at decision block 1008.

In decision block 1008, a check is made to determine if a current block is significant. If decision block 1008 returns false (no), processing continues at step 1010. In step 1010, a zero (0) is output in the coded representation and the currentBitNumber is decremented, that is, the next lower bit plane is selected. Processing then continues at decision block 1004. Otherwise, if decision block 1008 returns true (yes) processing continues at step 1012.

Decision blocks 1004 and 1008 along with step 1010 enable the process to find the MSB number of the largest coefficient in the block. A block is insignificant with respect to the currentBitNumber if the MSB number of every coefficient in the block is less than the currentBitNumber. This is repeated until the bitplane of the block is significant or the currentBitNumber is less than the minBitNumber.

In step 1012, a one (1) is output in the coded representation to indicate the bitplane is significant. In step 1014, the DC subband is coded. In step 1016, the block detail is coded using the parameters J, currentBitNumber and minBitNumber. In step 1018, execution returns to the calling procedure. Thus, given that the block is significant, steps 1012, 1014 and 1016 are carried out to use the (generalised) quadtree segmentation to find all coefficients with an MSB number greater than the minBitNumber. If the block is significant, it is partitioned into two "sub-blocks": the DC subband coefficients and the block consisting of the remaining coefficients, referred to as the "block detail" for level J since it represents the high frequency information about the block of level J at all lower levels.

Figure 32:
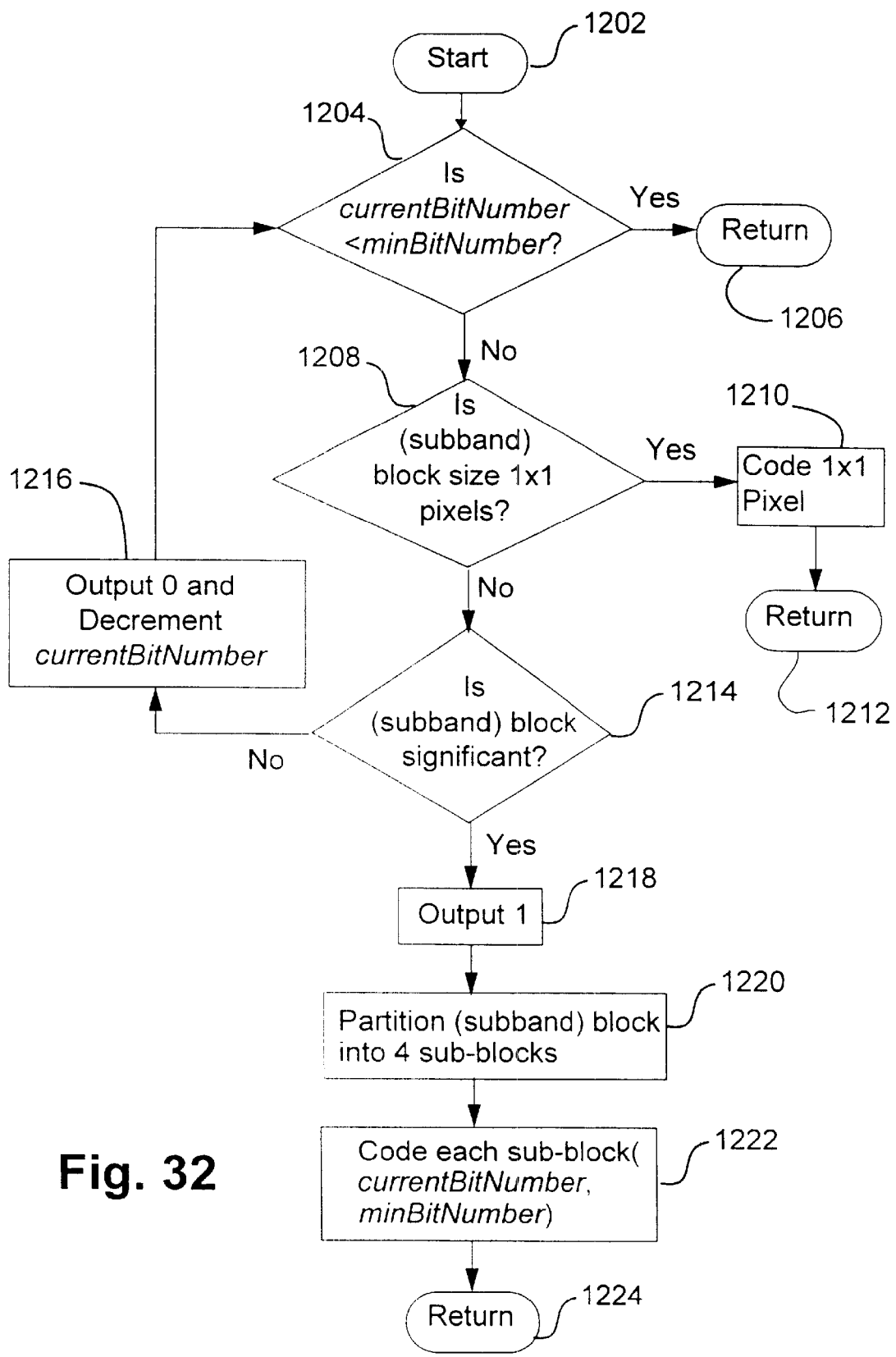

Step 1014 of FIG. 30 for coding the DC subband is illustrated in detail by the flow diagram of FIG. 32. That is, FIG. 32 shows the process of coding a subband or sub-block using currentBitNumber and minBitNumber parameters. In step 1202, processing commences. In decision block 1204, a check is made to determine if the currentBitNumber is less than the minBitNumber. If decision block 1204 returns true (yes), processing continues at step 1206. In step 1206, execution returns to the calling procedure. Otherwise, if decision block 1204 returns false (no), processing continues at decision block 1208.

In decision block 1208 a check is made to determine if the (subband) block size is 1×1 pixels. If decision block 1208 returns true (yes), processing continues at step 1210. In step 1210, the 1×1 pixel is coded. This involves outputting the bits between the currentBitNumber and the minBitNumber, inclusive, followed by a sign bit if necessary. Processing then returns to the calling procedure in step 1212. Otherwise, if decision block 1208 returns false (no), processing continues at decision block 1214.

In decision block 1214, a check is made to determine if the (subband) block is significant. If decision block 1214 returns false (no), processing continues at step 1216. In step 1216, a zero (0) is output in the coded representation and the currentBitNumber is decremented. Processing then continues at decision block 1204. Otherwise, if decision block 1214 returns true (yes), processing continues at step 1218.

In step 1218, a one (1) is output in the coded representation to indicate that the (subband) block is significant. In step 1220, the (subband) block is partitioned into four sub-blocks. In step 1222, each sub-block is coded using the parameters currentBitNumber and minBitNumber, by means of a recursive call to the process of FIG. 32. In step 1224, execution returns the calling procedure.

Thus, in the process of FIG. 32, a subband or sub-block thereof is coded. The largest MSB number is isolated as before. If the sub-block consists of only one pixel, it is coded as a single coefficient. Otherwise, the currentBitNumber is decremented and a zero (0) is output in the coded representation until the currentBitNumber is less than the minBitNumber, or the subband (sub-block) is significant. If the subband (sub-block) is significant, it is partitioned into four (as close to equal as possible) sub-block, and these are coded in turn. A single coefficient, for example the DC coefficient, is encoded by outputting the coefficient bits from the currentBitNumber to the minBitNumber. Again, the sign is preferably only output if some of the coefficient bits are non-zero.

Figure 31:
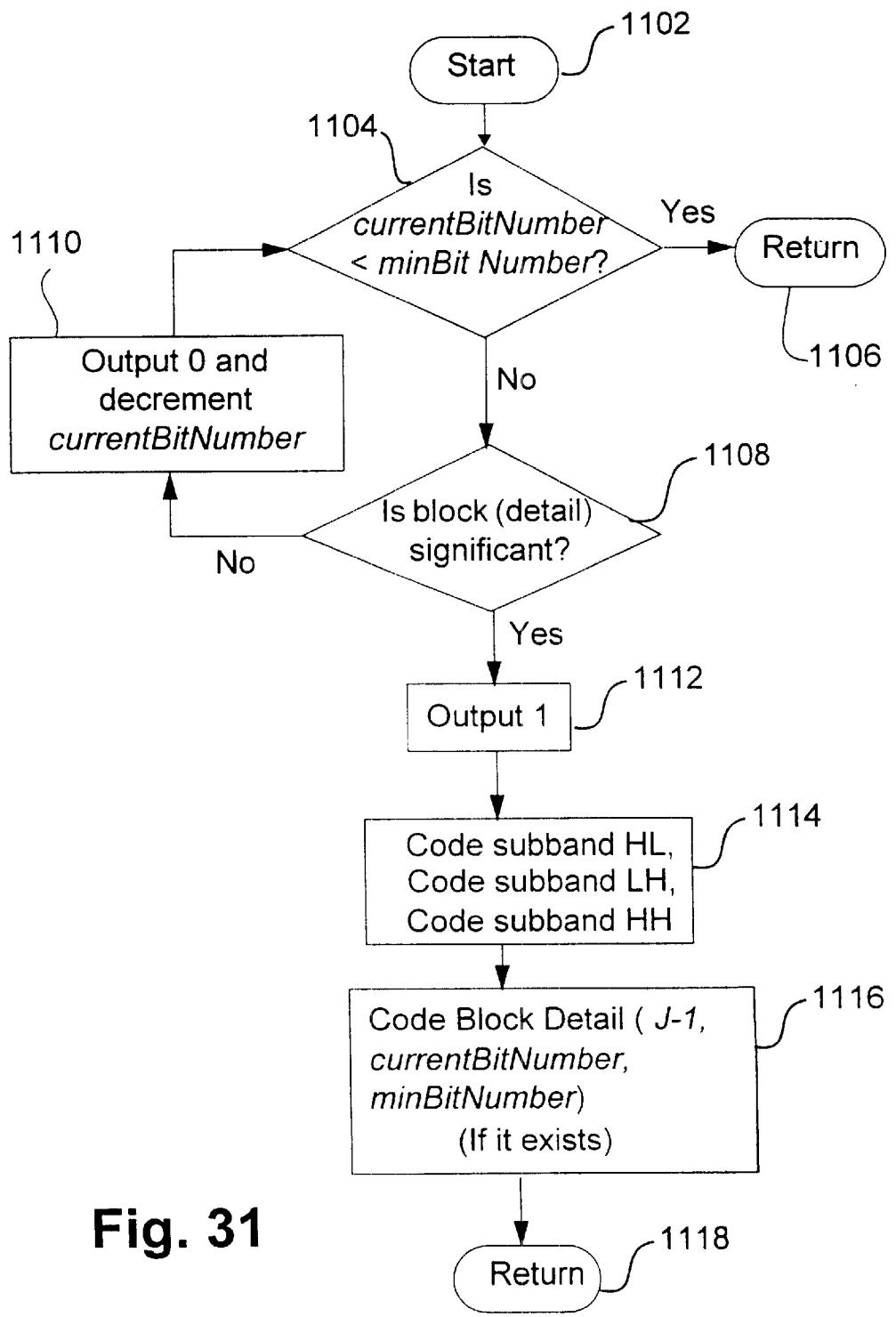

Step 1016 of FIG. 30 for coding block detail is illustrated by the flow diagram of FIG. 31. In step 1102, processing commences. In decision block 1104, a check is made to determine if the currentBitNumber is less than the minBitNumber. If decision block 1104 returns true (yes), execution returns to the calling procedure in step 1106. Otherwise, if decision block 1104 returns false (no), processing continues at decision block 1108.

In decision block 1108, a check is made to determine if the block (detail) is significant. If decision block 1108 returns false (no), processing continues at step 1110. In step 1110, a zero (0) is output in the coded representation and the currentBitNumber is decremented. Processing then continues at decision block 1104. Otherwise, if decision block 1108 returns true (yes), processing continues at step 1112.

In step 1112, a one (1) is output in the coded representation to indicate that the block (detail) is significant. In step 1114, each of the high-low (HL), low-high (LH), and high-high (HH) frequency subbands is coded. The HL, LH, and HH frequency subbands of each resolution are commonly referred to as AC subbands. Each of these subbands is coded in accordance with the process of FIG. 12. In step 1116, the block detail is coded using the parameters J-1, currentBitNumber and minBitNumber (if the block detail exists) by means of a recursive call to the process illustrated in FIG. 11. Execution returns to the calling procedure in step 1118.

Thus, the block detail for level J is processed to first isolate the MSB number of the largest coefficient. This is done by decrementing the currentBitNumber and outputting zeros until the block is significant. The block is then partitioned into the three high frequency subbands at level J and the block detail for level J-1 (if J-1 is greater than 0). This partitioning approach is motivated by the so called 1/f type spectral models.

The decoding process for the alternate SWEET method can be implemented by mimicking the coding process described with reference to FIGS. 29 to 32.

SWEET therefore provides methods and apparatuses for representing digital image data in an efficient and flexible manner, in which the representation is suitable for storing and/or transmitting images. The encoding techniques can be used generally to represent an array of transform coefficients, and to provide an efficient representation by representing an image in the discrete wavelet transform domain. In particular, the embodiments provide methods and apparatuses for representing (or coding) leading zeros of blocks of transform coefficients obtained from an input image. The techniques are efficient in terms of offering a good reproduction of the original image for a given size code and offering fast decoding. Further, the techniques are flexible in that coefficients obtained from a linear transformation are encoded independently without the use of entropy coding. The advantageous aspects of the embodiment include the depth first nature of the coding. Further, in the case of coding subbands, the advantageous aspects of the invention include hierarchical coding of each subband separately.

Summary

It will be apparent from the foregoing that a number of arrangements are disclosed that provide for the manipulation of images, and in particular thumbnail images using fast zoom, aspect ratio zooming as well as compression and scaling. Such methods find particular application in image-based file management systems and browsing-type applications used in computer systems and the like. However, such applications should be construed only as exemplary of the various described embodiments.

The foregoing only describes a small number of embodiments of the present invention, however, modifications and/or changes can be made thereto by a person skilled in the art without departing from the scope and spirit of the invention.

What is claimed is:

1. A method of zooming an image on a display device, said method comprising the successive steps of:
    displaying a first image at a first predetermined size;
    stretching or shrinking the first image to one or more predetermined image sizes;
    successively displaying at least one modified image, each one of said modified image being related to a respective one of said stretched or shrunken images; and
    thereafter displaying a second image related to a zoomed version of said first image at a second predetermined image size different from said first predetermined image size.

2. A method according to claim 1, wherein said first representation of said image is stored on a memory storage means in an encoded format and said step of displaying said first representation further includes a decoding of said image for display.

3. A method according to claim 2, wherein the encoded format is a compressed image format.

4. A method according to claim 3, wherein the compressed image format is a wavelet coding technique.

5. A method according to claim 4, wherein said wavelet coding technique comprises the SWEET method.

6. A method according to claim 3, wherein the compressed image format is achieved by a JPEG coding technique.

7. A method according to claim 6, wherein said single image is stored as a single compressed image and wherein the first and second images are extracted from the single compressed image.

8. A method according to claim 1, wherein said image is stored on a memory storage means in an encoded format and said step of displaying said further representation further includes a decoding of said further representation of said image for display.

9. A method according to claim 8, wherein said image is coded into said encoded format by a method of representing a digital image to provide a coded representation, said method comprising the steps of:
    transforming said digital image to derive a plurality of coefficients, each coefficient represented by a predefined bit sequence;
    selecting a portion of said plurality of coefficients as a region;
    (a) scanning the significance of each bitplane of said selected region from a most significant bitplane towards a least significant bitplane and providing a first token in said coded representation for each insignificant bitplane until a significant bitplane is determined, wherein a second token is provided in said coded representation for said significant bitplane;
    (b) partitioning said selected region into two or more subregions having a predetermined form, and setting each of said subregions as said selected region;
    (c) repeating steps (a) and (b) commencing from said significant bitplane until said selected region has a predetermined size, wherein said coefficients of said selected region are coded and provided in said coded representation.

10. A method according to claim 9, wherein said transforming step comprises applying a discrete wavelet transform to said digital image.

11. A method according to claim 10, wherein said portion comprises a subband of said plurality of coefficients.

12. A method according to claim 9, wherein said region comprises said entire plurality of coefficients.

13. A method according to claim 9, wherein said first and second tokens comprise bit values of 0 and 1, respectively.

14. A method according to claim 9, wherein said subregions are equally sized.

15. A method according to claim 14, wherein said subregions are square.

16. A method according to claim 9, wherein said predetermined size of said subregion is a 1×1 coefficient.

17. A method according to claim 16, wherein said 1×1 coefficient is encoded by outputting bits of said corresponding bit sequence beginning with the respective significant bitplane.

18. A method according to claim 17, wherein only bits of said corresponding bit sequence above a predetermined minimum bit level are output in said coded representation.

19. A method according to claim 9, wherein, in step (c), steps (a) and (b) are repeated otherwise until each bitplane of said selected region has been scanned.

20. A method according to claim 19, wherein each bitplane of said selected region above a minimum bit level has been scanned.

21. A method according to claim 1, wherein the first and second image are different resolutions of a single image.

22. A method according to claim 1, wherein said stretching or shrinking comprises adjusting the size of the first image by manipulating pixels of the first image.

23. A method according to claim 22, wherein said stretching comprises mathematically manipulating values of groups of pixels to provide at least one pixel value, and replicating said at least one pixel value.

24. A method according to claim 22, wherein said shrinking comprises mathematically manipulating groups of pixels to provide at least one pixel value, and assigning said one pixel value to a limited number of pixels smaller than that contained in said groups.

25. A method according to claim 24 wherein said assigning comprises discarding pixels from said image.

26. A method of zooming an image on a display device, said method comprising the successive steps of:
    (a) decompressing a compressed true image to a first representation of said image at a predetermined size, and displaying said first representation;
    (b) if the predetermined size is smaller than a desired image size then (i) stretching the representation to a larger image size and displaying said stretched representation; and (ii) repeating step (b)(i) until said desired image size is reached;

(c) if the predetermined size is larger than a desired image size then (i) shrinking the representation to a smaller image size and displaying said shrunk representation; and (ii) repeating step (c)(i) until said desired image size is reached, and (d) decompressing the compressed true image to a further zoomed representation at said desired image size being different from the predetermined size and displaying said further representation.

27. A method according to claim 26, wherein step (d) occurs substantially simultaneously during steps (a) (b) and (c).

28. Apparatus for zooming an image for display on a display device, said apparatus comprising:

means for displaying a first representation of said image at a first predetermined size;

means for stretching or shrinking said first representation to at least one further predetermined size;

means for successively displaying said stretched or shrunken representation at each said further predetermined size, and means for displaying a second representation of said image related to a zoomed version of said first image, at a second predetermined size being different from said first predetermined image size.

29. Apparatus according to claim 28, wherein means for displaying said second representation operates substantially simultaneously with the other said means.

30. A computer program product comprising a computer readable medium having a computer program recorded thereon for zooming images for display on a display device, said computer program product comprising:

means for displaying a first representation of said image at a first predetermined size;

means for stretching or shrinking said first representation to at least one further predetermined size;

means for successively displaying said stretched or shrunken representation at each said further predetermined size, and means for displaying a second representation of said image related to a zoomed version of said first image at a second predetermined size being different from said first predetermined image size.

31. A method of zooming thumbnails of digital images for use in image browsing, said method comprising the steps of:

laying out said thumbnails in at least one containment area having the same aspect ratio as an available display area of a display means; and scaling said thumbnails contained in said at least one containment area to fit within the available area of said containment area.

32. A method according to claim 31, further comprising the step of increasing the scale of said thumbnails if increased detail of said thumbnails is required for assessment.

33. A method according to claim 32, wherein said thumbnails are scaled to be as large as possible and fit within said available display area.

34. A method according to claim 31, further comprising the step of organising said thumbnails into two or more groups in respective containment areas.

35. A method according to claim 34, wherein said groups have a hierarchical structure.

36. A method according to claim 34, wherein one or more groups laid out in respective containment areas comprises two or more subgroups of thumbnails laid out in respective subcontainment areas, each subcontainment area having the same aspect ratio as the parent containment area and said displayable area.

37. A method according to claim 31, wherein one or more of said digital images is generated using a digital image capture device.

38. A method according to claim 31, wherein said scaling comprises zooming said thumbnails according to a method comprising the steps of:

displaying a first representation of said image at a first predetermined size, said first representation having a first predetermined resolution;

stretching or shrinking the first representation to provide one or more modified representations;

successively displaying said one or more modified representations; and thereafter displaying a further representation of said image at a second predetermined size, said further representation having a further predetermined resolution;

wherein said further predetermined size and resolution are different to said first predetermined size and resolution.

39. Apparatus for zooming thumbnails of digital images for use in image browsing, said thumbnails being displayable on a display means, said apparatus comprising:

means for laying out said thumbnails in at least one containment area having the same aspect ratio as an available display area of a display means; and means for scaling said thumbnails contained in said at least one containment area to fit within the available area of said containment area.

40. Apparatus according to claim 39, further comprising:

a computer;

a computer readable medium having recorded thereon a computer program for zooming said digital images, said computer program carrying out the steps of:

laying out said thumbnails in at least one containment area having the same aspect ratio as an available display area of a display means; and scaling said thumbnails contained in said at least one containment area to fit within the available area of said containment area, wherein said computer program can be loaded into and run by said computer to implement said apparatus.

41. A computer program product having a computer readable medium having a computer program recorded thereon for zooming thumbnails of digital images for use in image browsing, said computer program product comprising:

means for laying out said thumbnails in at least one containment area having the same aspect ratio as an available display area of a display means; and means for scaling said thumbnails contained in said at least one containment area to fit within the available area of said containment area.

42. A method of scaling thumbnails representing digital images, said method comprising the step of:

encoding a digital image using a hierarchical representation to provide a thumbnail.

43. A method according to claim 42, further comprising the step of decoding said hierarchical representation of said digital image at a predetermined one of a plurality of scales to provide said thumbnail having a desired size.

44. A method according to claim 43, wherein the scale of said decoded hierarchical representation is equal to or greater than the desired size of said thumbnail.

45. A method according to claim 43, further comprising the step of downsampling the decoded hierarchical representation to provide the desired-size thumbnail if the scale of said decoded hierarchical representation is greater than the desired size of said thumbnail.

46. A method according to claim 43, further comprising the step of upsampling the decoded hierarchical representation to provide the desired-size thumbnail if the scale of said decoded hierarchical representation is less than the desired size of said thumbnail.

47. A method according to claim 43, further comprising the step of displaying said thumbnail.

48. A method according to claim 43, further comprising the step of caching said hierarchical representation and/or said decoded hierarchical representation.

49. A method according to claim 48, further comprising the step of caching intermediate size or scaled versions of said decoded hierarchical representation.

50. A method according to claim 42, further comprising the step of decoding said hierarchical representation of said digital image at two different adjacent scales of a plurality of scales to provide said thumbnail having a desired size.

51. A method according to claim 50, further comprising the step of interpolating between the two decoded hierarchical representations having different adjacent scales to provide the desired-size thumbnail if the scale of one of said two decoded hierarchical representations is greater than the desired thumbnail size and the other of said two decoded hierarchical representations is less than the desired thumbnail size.

52. A method according to claim 42, wherein said encoding step includes the step of applying a hierarchical discrete wavelet transform to said image.

53. A method according to claim 52, wherein the encoding comprises the steps of:
transforming said digital image to derive a plurality of coefficients, each coefficient represented by a predefined bit sequence;
selecting a portion of said plurality of coefficients as a region;
(a) scanning the significance of each bitplane of said selected region from a most significant bitplane towards a least significant bitplane and providing a first token in said coded representation for each insignificant bitplane until a significant bitplane is determined, wherein a second token is provided in said coded representation for said significant bitplane;
(b) partitioning said selected region into two or more subregions having a predetermined form, and setting each of said subregions as said selected region;
(c) repeating steps (a) and (b) commencing from said significant bitplane until said selected region has a predetermined size, wherein said coefficients of said selected region are coded and provided in said coded representation.

54. A method according to claim 53, wherein said transforming step comprises applying a discrete wavelet transform to said digital image.

55. A method according to claim 54, wherein said portion comprises a subband of said plurality of coefficients.

56. A method according to claim 53, wherein said region comprises said entire plurality of coefficients.

57. A method according to claim 53, wherein said first and second tokens comprise bit values of 0 and 1, respectively.

58. A method according to claim 53, wherein said sub-regions are equally sized.

59. A method according to claim 58, wherein said sub-regions are square.

60. A method according to claim 53, wherein said predetermined size of said subregion is a 1×1 coefficient.

61. A method according to claim 60, wherein said 1×1 coefficient is encoded by outputting bits of said corresponding bit sequence beginning with the respective significant bitplane.

62. A method according to claim 61, wherein only bits of said corresponding bit sequence above a predetermined minimum bit level are output in said coded representation.

63. A method according to claim 53, wherein, in step (c), steps (a) and (b) are repeated otherwise until each bitplane of said selected region has been scanned.

64. A method according to claim 63, wherein each bitplane of said selected region above a minimum bit level has been scanned.

65. A method according to claim 52, wherein said encoding comprises the steps of:
decomposing said image using a subband transform to provide a number of subbands;
for each subband, selecting said subband as an initial region and performing the following sub-steps:
(a) checking if a current bit level of the selected region is significant;
(b) if said current bit level is significant, outputting a first token in a coded representation and partitioning said selected region into a number of equally sized subregions, wherein each sub-region is processed as said selected region in turn;
(c) if said current bit level is insignificant, outputting a second token in said coded representation and selecting the next lower bit level of said selected region as said current bit level;
(d) repeating steps (a) to (c) until said current bit level is less than a specified minimum bit level, or said selected region has a predetermined size and coefficients of said selected region are coded in said coded representation.

66. A method according to claim 65, wherein said coefficients of said selected region are coded by representing each coefficient by the bits between the corresponding current bit level and the minimum bit level.

67. A method according to claim 65, wherein said subband transform comprises a discrete wavelet transform.

68. A method according to claim 52, wherein said encoding comprises the steps of:
a) dividing the digital image into a plurality of blocks;
b) applying a subband transform to each of said blocks to provide a plurality of AC subband regions, at one or more resolutions, and a DC subband region for each block;
c) selecting said DC subband region as a selected region and performing the following sub-steps:
ca) checking if a current bitplane of the selected region is significant;
cb) if said current bitplane is significant, outputting a first token in a coded representation and partitioning said selected region into a number of sub-regions, wherein each sub-region is processed as the selected region in turn;

cc) if said current bitplane is insignificant, outputting a second token in the coded representation and selecting the next lower bitplane of the selected region as the current bitplane;

cd) repeating sub-steps ca) to cc) until said current bitplane is less than a specified minimum bitplane, or said selected region has a predetermined size and coefficients of said selected region are coded in said coded representation;

d) selecting substantially all uncoded AC subband regions as a remaining region of each block and scanning the significance of each bitplane of the remaining region from a most significant bitplane towards a least significant bitplane, and outputting the second token for each insignificant bitplane until a significant bitplane is determined;

e) setting one or more AC subband regions, of a current resolution level, as a selected region and performing the sub-steps ca) to cd);

f) repeating step e) until substantially all AC subbands of the current resolution level have been encoded; and g) repeating steps d) to f) until all AC subbands of each block have been encoded.

69. Apparatus for scaling thumbnails representing digital images, said apparatus comprising:

means for storing a thumbnail, said thumbnail comprising a hierarchically encoded representation of a digital image; and means for decoding said hierarchical representation of said digital image at at least a predetermined one of a plurality of scales to provide said thumbnail having a desired size.

70. Apparatus according to claim 69, wherein the scale of said decoded hierarchical representation is equal to or greater than the desired size of said thumbnail.

71. Apparatus according to claim 69, further comprising means for downsampling the decoded hierarchical representation to provide the desired-size thumbnail if the scale of said decoded hierarchical representation is greater than the desired size of said thumbnail.

72. Apparatus according to claim 69, further comprising means for upsampling the decoded hierarchical representation to provide the desired-size thumbnail if the scale of said decoded hierarchical representation is less than the desired size of said thumbnail.

73. Apparatus according to claim 69, wherein said decoding means decodes said hierarchical representation of said digital image at two different adjacent scales of a plurality of scales to provide said thumbnail having a desired size.

74. Apparatus according to claim 73, further comprising means for interpolating between the two decoded hierarchical representations having different adjacent scales to provide the desired-size thumbnail if the scale of one of said two decoded hierarchical representations is greater than the desired thumbnail size and the other of said two decoded hierarchical representations is less than the desired thumbnail size.

75. Apparatus according to claim 69, further comprising display means for displaying said thumbnail.

76. Apparatus according to claim 69, further comprising means for encoding said digital image to provide said hierarchically encoded representation.

77. Apparatus according to claim 76, wherein said encoding means includes means for applying a hierarchical discrete wavelet transform to said image.

78. Apparatus according to claim 77, wherein encoding comprises SWEET encoding.

79. Apparatus according to claim 69, further comprising means for caching said hierarchical representation and/or said decoded hierarchical representation.

80. Apparatus according to claim 79, further comprising means for caching intermediate size or scaled versions of said decoded hierarchical representation.

81. A computer program product comprising a computer readable medium having a computer program recorded thereon for scaling thumbnails representing digital images, said computer program product comprising:

means for storing a thumbnail, said thumbnail comprising a hierarchically encoded representation of a digital image; and means for decoding said hierarchical representation of said digital image at at least a predetermined one of a plurality of scales to provide said thumbnail having a desired size.

82. The computer program product according to claim 81, wherein the scale of said decoded hierarchical representation is equal to or greater than the desired size of said thumbnail.

83. The computer program product according to claim 81, further comprising means for downsampling the decoded hierarchical representation to provide the desired-size thumbnail if the scale of said decoded hierarchical representation is greater than the desired size of said thumbnail.

84. The computer program product according to claim 81, further comprising means for upsampling the decoded hierarchical representation to provide the desired-size thumbnail if the scale of said decoded hierarchical representation is less than the desired size of said thumbnail.

85. The computer program product according to claim 81, wherein said decoding means decodes said hierarchical representation of said digital image at two different adjacent scales of a plurality of scales to provide said thumbnail having a desired size.

86. The computer program product according to claim 85, further comprising means for interpolating between the two decoded hierarchical representations having different adjacent scales to provide the desired-size thumbnail if the scale of one of said two decoded hierarchical representations is greater than the desired thumbnail size and the other of said two decoded hierarchical representations is less than the desired thumbnail size.

87. The computer program product according to claim 81, further comprising display means for displaying said thumbnail.

88. The computer program product according to claim 81, further comprising means for ending said digital image to provide said hierarchically encoded representation.

89. The computer program product according to claim 88, wherein said encoding means includes means for applying a hierarchical discrete wavelet transform to said image.

90. The apparatus according to claim 89, wherein encoding comprises SWEET encoding.

91. A method according to claim 81, further comprising means for caching said hierarchical representation and/or said decoded hierarchical representation.

92. A method according to claim 91, further comprising means for caching intermediate size or scaled versions of said decoded hierarchical representation.

93. An image-based computerized file browsing system comprising:

a storage device for retaining a plurality of images, at least a group of which are stored in an encoded format;

a processor for running an operating system incorporating a file management arrangement wherein true images retained in said storage device are depicted as thumbnail representations when viewed via said file management arrangement; and image manipulation means for manipulating said thumbnail representations so as to be alterable in size and such that only a limited number of size alterations result from decoding from said encoded format, the remainder arising from pixel manipulation of intermediate sized images sized between a starting size and an ending size.

94. A system according to claim 93, wherein said file management arrangement groups certain ones of said representations into containment areas whereby an aspect ratio of said containment areas corresponds to that of a display device upon which said images and representations are reproduced.

95. A system according to claim 94, wherein representations within a containment area can be treated as a single representation when the display size of the containment area is being altered.

96. A system according to claim 93, wherein said images are encoded according to a hierarchical coding scheme that provides for incremental decoding of different resolutions of an image and said image manipulation arrangement decodes said thumbnail representations via one of said increments when performing a size alternation.

* * * * *

UNITED STATES PATENT AND TRADEMARK OFFICE
CERTIFICATE OF CORRECTION

PATENT NO. : 6,545,687 B2
DATED : April 8, 2003
INVENTOR(S) : Paul Q. Scott et al.

It is certified that error appears in the above-identified patent and that said Letters Patent is hereby corrected as shown below:

<u>Title page,</u>
Item [75], Inventor, "Globe" should read -- Glebe --.
Item [*] Notice, insert the following:
-- This patent issued on a continued prosecution application filed under 37 CFR 1.53(d), and is subject to the twenty year patent term provisions of 35 U.S.C. 1.54(a)(2). --.

<u>Column 29,</u>
Line 8, "111100100000100000110000000001" should read
-- 111100100000100000110000000001 --.

<u>Column 33,</u>
Line 27, "first" should read -- first representation of said -- and "size;" should read
-- size, said first representation having a first predetermined resolution; --.
Line 28, "image to" should read -- representation --.
Line 29, "predetermined image sizes;" should read -- modified representations; --.
Line 30, "at least one modified image, each" should read -- said one or more modified representations; and --.
Lines 32-33, should be deleted.
Line 34, "second image related to a zoomed" should read -- further representation of said image --.
Line 35, "version of said first image" should be deleted.
Line 36, "size" should read -- size, said further representation having a further predetermined resolution; wherein said further predetermined size and resolution are --.
Line 37, "image size." should read -- size and resolution. --.
Line 52, "single" should be deleted.
Line 54, "second" should read -- further representations of said --.

<u>Column 34,</u>
Line 45, "the first and" should read -- said modified representations are displayed at said first predetermined resolution.--
Line 46, should be deleted.
Line 48, "first" should read -- representation of said first --.
Line 49, "first" should read -- representation of said first --.
Line 59, "claim 24" should read -- claim 24, --.
Line 63, "decompressing" should read -- displaying a representation of --, "to a first" should be deleted.
Line 64, "representation of said image" should be deleted, and "size," should read
-- size; --.
Line 65, should be deleted.

UNITED STATES PATENT AND TRADEMARK OFFICE
CERTIFICATE OF CORRECTION

PATENT NO. : 6,545,687 B2
DATED : April 8, 2003
INVENTOR(S) : Paul Q. Scott et al.

It is certified that error appears in the above-identified patent and that said Letters Patent is hereby corrected as shown below:

Column 35,
Line 11, "to a further" should be deleted.
Line 12, should be deleted.
Line 13, "different from the predetermined size" should be deleted.
Line 14, "further representation." should read -- decompressed image at said desired image size, wherein said desired image size is different from the predetermined size. --.
Line 16, "(a)" should read -- (a), --.

Column 37,
Line 13, "upsampling" should read -- unsampling --.

Column 39,
Line 42, "upsampling" should read -- unsampling --.

Column 42,
Line 13, "alternation." should read -- alteration. --.

Signed and Sealed this

Eleventh Day of October, 2005

JON W. DUDAS
*Director of the United States Patent and Trademark Office*